(12) United States Patent
Huynh et al.

(10) Patent No.: US 11,420,773 B2
(45) Date of Patent: Aug. 23, 2022

(54) ENGINE THRUST RATING ARCHITECTURE AND PROCESSES

(71) Applicant: The Boeing Company, Chicago, IL (US)

(72) Inventors: Kiet T. Huynh, Seattle, WA (US); Kevin S. Brown, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 773 days.

(21) Appl. No.: 16/366,015

(22) Filed: Mar. 27, 2019

(65) Prior Publication Data

US 2020/0307831 A1 Oct. 1, 2020

(51) Int. Cl.
| | |
|---|---|
| *B64G 1/00* | (2006.01) |
| *G05D 1/00* | (2006.01) |
| *B64G 1/40* | (2006.01) |
| *B64G 1/24* | (2006.01) |
| *F02C 9/28* | (2006.01) |

(52) U.S. Cl.
CPC .............. *B64G 1/002* (2013.01); *B64G 1/24* (2013.01); *B64G 1/405* (2013.01); *G05D 1/0005* (2013.01); *F02C 9/28* (2013.01)

(58) Field of Classification Search
CPC .......... B64G 1/002; B64G 1/24; B64G 1/405; G05D 1/0005; F02C 9/28; F05D 2260/83; F05D 2260/81
See application file for complete search history.

(56) References Cited

U.S. PATENT DOCUMENTS

| | | | | |
|---|---|---|---|---|
| 8,412,392 B2* | 4/2013 | Jayathirtha | .......... | G05D 1/0005 701/5 |
| 8,566,000 B2* | 10/2013 | Lickfold | ................... | F02C 9/32 701/100 |
| 8,645,009 B2* | 2/2014 | Klooster | .............. | G05D 1/0607 701/4 |
| 9,483,058 B2* | 11/2016 | Moxon | ................ | G01C 23/005 |
| 10,062,291 B1* | 8/2018 | Kim | ....................... | G07C 5/085 |

* cited by examiner

*Primary Examiner* — Joseph J Dallo
(74) *Attorney, Agent, or Firm* — Gates & Cooper LLP

(57) ABSTRACT

An engine thrust rating process and system for controlling engine thrust during flight of an aircraft and/or to support an airplane development program (including design, validation testing, and production of airplane systems, airplane dispatch and operation tools). The thrust rating process uses thrust ratios derived from thrust expressed in power rather than engine rotor speed (N1). In one or more examples, the thrust rating architecture is based on "Max Rated Thrust" tables and the power setting parameter "PSP" being calculated at the end of the process instead of at the beginning of the process (unlike conventional procedures), thereby enabling the system software development early as needed to support the airplane development phase. This concept also yields improvements such as simplified control logic, optimized engine performance and engine life.

20 Claims, 10 Drawing Sheets

ENGINE THRUST RATING ARCHITECTURE AND PROCESSES

BACKGROUND

1. Field

A process and system for determining engine thrust.

2. Description of the Related Art

Engine thrust management processes are designed to support development, validation testing, and production of the airplane systems, airplane dispatch and operation tools. The process includes the design of engine thrust management software, a Propulsion Engine Performance Model (PEPM) including a Thrust Rating Model (TRM) and Engine Performance Model (EPM) logic and data, which reside in the electronic engine controller (EEC), the Flight Management Computer (FMC), the Airplane Flight Manual -Digital Performance Information (AFM-DPI), Low Speed Performance System (LSPS), and Electronic Flight Bag (EFB), see FIG. 1. The TRM calculates the thrust setting target N1 or Engine Pressure Ratio (EPR), and the EPM calculates the engine thrust and fuel flow at a thrust setting N1.

The thrust management software is needed early in the system development. An initial estimate of the engine thrust level versus N1 (or EPR) is necessary for PEPM development since the PEPM architecture is based on the power setting target N1 (in units of engine rotor speed). However, the thrust versus N1 relationship cannot be accurately derived until the engine thrust characteristic is finalized after the flight tests, at which time the PEPM must be updated. This convoluted sequence puts the design of engine thrust management software in the critical flows of the airplane development, testing and production processes. What is needed then, are more efficient ways of obtaining engine thrust ratings for different flight conditions. The present disclosure satisfies this need.

SUMMARY

The present disclosure describes a method of determining a thrust target for an engine powering an aircraft. The method can be embodied in many ways including, but not limited to, the following.

1. A method of determining a thrust target for an engine powering an aircraft, comprising the steps of:

(a) obtaining an idle thrust reference target as a function of a temperature, an airspeed (Mach number) of the aircraft, and an altitude of the aircraft;

(b) locking the idle thrust reference target at a time when the airspeed exceeds a predetermined speed comprising a lockup speed, so as to obtain a locked idle thrust reference target;

(c) obtaining an maximum climb thrust reference target as a function of the temperature, the airspeed, and the altitude;

(d) locking a value of the maximum climb thrust reference target when the airspeed exceeds the lockup speed, so as to obtain a locked maximum climb thrust reference target;

(e) obtaining a maximum take-off thrust reference target as a function of the temperature, the altitude, and the airspeed and obtaining a locked value of the maximum take-off thrust reference target, comprising a locked maximum take-off thrust reference target, when the airspeed exceeds the lockup speed;

(f) locking the temperature and the altitude used in (e) when the airspeed exceeds the lockup speed, so as to obtain a locked temperature comprising a runway temperature and a locked altitude comprising an altitude of a runway from which the aircraft is taking off;

(g) after the airspeed exceeds the lockup speed, obtaining an adjustment ("altitude lapse") to the maximum take-off thrust reference target as a function of the runway temperature, the altitude of the runway, and the airspeed, and adjusting the maximum take-off thrust reference target with the adjustment to obtain an adjusted (lapsed) maximum take-off thrust reference target;

(h) dividing the adjusted (lapsed) maximum take-off thrust reference target obtained in (g) by the locked maximum take-off thrust reference target obtained in (e), or determining a difference between the adjusted (lapsed) maximum take-off thrust reference target and the locked maximum take-off thrust reference target, to obtain a thrust ratio or thrust difference respectively;

(i) multiplying the locked maximum climb thrust reference target obtained in (d) by the thrust ratio obtained in (h), or adding the locked maximum climb thrust reference target obtained in (d) to the thrust difference obtained in (h), to obtain an adjusted (lapsed) maximum climb thrust reference target;

(j) multiplying the locked idle thrust reference target obtained in (b) by the thrust ratio obtained in (h), or adding the locked idle thrust reference target obtained in (b) to the thrust difference obtained in (h), to obtain an adjusted (lapsed) idle thrust reference target;

(k) obtaining a commanded lapsed take-off thrust target based on a setting position of a thrust lever (thrust lever resolver angle, TRA) by interpolating between the adjusted (lapsed) maximum take-off thrust reference target, the adjusted (lapsed) maximum climb thrust reference target, and the adjusted (lapsed) idle thrust reference target, wherein the commanded lapsed takeoff thrust target is a fraction of (or a fixed offset from) the maximum take-off thrust reference target; and (l) unlocking the values of temperature and the altitude after completion of take-off when the aircraft exceeds a pre-determined altitude and/or predetermined airspeed, so that a commanded thrust target is interpolated as a function of the TRA from the maximum take-off thrust reference target, the maximum climb thrust reference target, and the idle thrust reference target based on current real time values of the altitude, the temperature, and the airspeed (Mach number).

2. The method of embodiment 1, wherein:

the step (h) comprises dividing the adjusted (lapsed) maximum take-off thrust reference target obtained in (g) by the locked maximum take-off thrust reference target obtained in (e) to obtain the thrust ratio;

the step (i) comprises multiplying the locked maximum climb thrust reference target obtained in (d) by the thrust ratio obtained in (h) to obtain the adjusted (lapsed) maximum climb thrust reference target; and the step (j) comprises multiplying the locked idle thrust reference target obtained in (b) by the thrust ratio obtained in (h) to obtain the adjusted (lapsed) idle thrust reference target.

3. The method of embodiment 1, wherein the lockup speed is in a range of 50-100 knots.

4. The method of embodiment 1, wherein the steps (a)-(l) are performed in an electronic engine controller (EEC) on the aircraft.

5. The method of embodiment 1, wherein:

the airspeed is a current real time airspeed as indicated on an airspeed indicator and prior to the aircraft exceeding the pre-determined altitude and/or predetermined airspeed in step (1), the temperature comprises a current real time runway temperature, the altitude comprises a current real time runway altitude;

the idle thrust reference target is selected from a set of maximum idle thrust values for the engine, each of the maximum idle thrust values determined for the airspeed comprising one or more different airspeed values, the temperature, and the altitude;

the maximum climb thrust reference target is selected from a set of maximum climb thrust values for the engine, each of the maximum climb thrust values determined for the one or more different airspeed values, the temperature, and the altitude;

the maximum take-off thrust reference target is selected from a set of maximum take-off thrust values for the engine, each of the maximum take-off thrust values determined for the one or more different airspeed values, the temperature, and the altitude;

the locking of the idle thrust reference target comprises selecting and setting the locked idle thrust reference target comprising the one of the maximum idle thrust values determined for the temperature, the altitude, and the airspeed when the airspeed first exceeds the lockup speed;

the locking of the maximum climb thrust reference target comprises selecting and setting the locked maximum climb thrust reference target comprising the one of the maximum climb thrust values determined for the temperature, the altitude, and the airspeed when the airspeed first exceeds the lockup speed;

the locking of the temperature and the altitude comprises selecting and setting the locked temperature and the locked altitude as the current real time runway temperature and the current real time runway altitude, respectively, when the airspeed first exceeds the lockup speed in (e); and the commanded lapsed takeoff thrust target is used to control an actual thrust of the engine.

6. The method of embodiment 1, further comprising:

during take-off, changing the TRA so that the commanded lapsed take-off thrust target determined in an electronic engine controller (EEC) matches a TMF-FMF take-off thrust setting target determined using a TMF-FMF computing platform; and during a climb phase, changing the TRA so that the commanded thrust target (determined in the EEC) matches a TMF-FMF climb thrust setting target or a TMF-FMF maximum continuous thrust setting target determined using the TMF-FMF computing platform. 7. The method of embodiment 6, further comprising:

determining thrust setting targets, using the TMF-FMF computing platform on the aircraft and a DPI-LSPS computing platform located off the aircraft, comprising:

a plurality of take-off thrust setting targets in units of power during takeoff roll and a first segment of climb-out of the aircraft, including:

the TMF-FMF take-off thrust setting target determined using the TMF-FMF computing platform, as a function of the temperature comprising a runway temperature, the altitude, and the airspeed, a DPI-LSPS take-off thrust setting target determined using a DPI-LSPS computing platform as a function of the temperature comprising a runway temperature, the altitude comprising a runway altitude, and the airspeed, and wherein the TMF-FMF take-off thrust setting target and the DPI-LSPS take-off thrust setting target comprise a maximum take-off thrust setting target or a derated take-off thrust setting target;

a plurality of climb thrust setting targets in units of power during airplane climb-out, including:

the TMF-FMF climb thrust setting target determined using the TMF-FMF computing platform as a function of the temperature, the the airspeed, and the the altitude of the aircraft, a DPI-LSPS climb thrust setting target, determined using the DPI-LSPS computing platform as a function of the temperature, the airspeed, and the altitude and wherein the TMF-FMF climb thrust setting target and the DPI-LSPS climb thrust setting target comprise a maximum climb thrust setting target or a derated climb thrust setting target; and a plurality of maximum continuous thrust setting targets in units of power during airplane climb-out with Engine-Out condition, including:

a TMF-FMF maximum continuous thrust setting target determined using the TMF-FMF computing platform as a function of the temperature, the airspeed, and the altitude, and a DPI-LSPS maximum continuous thrust setting target, determined using the DPI-LSPS computing platformas a function of the temperature, the airspeed, and the altitude.

8. The method of embodiment 7, wherein the take-off thrust setting targets, the climb thrust setting targets and the maximum continuous thrust setting targets are determined by:

determining the maximum take-off thrust setting target as a function of the temperature, the altitude, and the airspeed;

selecting a value of the temperature and the value of the altitude when the airspeed first exceeds the lockup speed, so as to obtain a selected temperature and a selected altitude;

determining an adjustment to the maximum take-off thrust setting target as a function of the selected temperature, the selected altitude, and the altitude, and adjusting the maximum take-off thrust setting target with the adjustment to obtain an adjusted maximum take-off thrust setting target;

multiplying the adjusted maximum take-off thrust setting target obtained with a takeoff derated percentage which is determined by a dispatch information, to obtain the derated take-off thrust setting target;

determining the maximum climb thrust setting targets as a function of the temperature, the altitude, and airspeed;

multiplying the maximum climb thrust setting target by a climb derated percentage which is determined by the dispatch information, to obtain a derated climb thrust setting target; and determining the maximum continuous thrust setting targets as a function of the temperature, the altitude, and the airspeed.

9. An Electronic Engine Controller (EEC), comprising:

a processor:

(a) obtaining an idle thrust reference target as a function of a temperature, an airspeed (Mach number) of an aircraft, and an altitude of the aircraft;

(b) locking the idle engine thrust reference target at a time when the airspeed exceeds a predetermined speed comprising a lockup speed, so as to obtain a locked idle thrust reference target;

(c) obtaining an maximum climb thrust reference target as a function of the temperature, the airspeed, and the altitude;

(d) locking a value of the maximum climb thrust reference target when the airspeed exceeds the lockup speed, so as to obtain a locked maximum climb thrust reference target;

(e) obtaining a maximum take-off thrust reference target as a function of the temperature, the altitude, and the airspeed and obtaining a locked value of the maximum take-off thrust reference target, comprising a locked maximum take-off thrust reference target, when the airspeed exceeds the lockup speed;

(f) locking the temperature and the altitude used in (e) when the airspeed exceeds the lockup speed, so as to obtain a locked temperature comprising a runway temperature and a locked altitude comprising an altitude of a runway from which the aircraft is taking off;

(g) after the airspeed exceeds the lockup speed, obtaining an adjustment ("altitude lapse") to the maximum take-off thrust reference target as a function of the runway temperature, the altitude of the runway, and the airspeed, and adjusting the maximum take-off thrust reference target with the adjustment to obtain an adjusted (lapsed) maximum take-off thrust reference target;

(h) dividing the adjusted (lapsed) maximum take-off thrust reference target obtained in (g) by the locked maximum take-off thrust reference target obtained in (e), or determining a difference between the adjusted (lapsed) maximum take-off thrust reference target and the locked maximum take-off thrust reference target, to obtain a thrust ratio or thrust difference respectively;

(i) multiplying the locked maximum climb thrust reference target obtained in (d) by the thrust ratio obtained in (h), or adding the locked maximum climb thrust reference target obtained in (d) to the thrust difference obtained in (h), to obtain an adjusted (lapsed) maximum climb thrust reference target;

(j) multiplying the locked idle thrust reference target obtained in (b) by the thrust ratio obtained in (h), or adding the locked idle thrust reference target obtained in (b) to the thrust difference obtained in (h), to obtain an adjusted (lapsed) idle thrust reference target;

(k) obtaining a commanded lapsed take-off thrust target based on a setting position of a thrust lever (thrust lever resolver angle, TRA) by interpolating between the adjusted (lapsed) maximum take-off thrust reference target, the adjusted (lapsed) maximum climb thrust reference target, and the adjusted (lapsed) idle thrust reference target, wherein the commanded lapsed takeoff thrust target is a fraction of (or a fixed offset from) the maximum take-off thrust reference target; and (l) unlocking the values of temperature and the altitude after completion of take-off when the aircraft exceeds a pre-determined altitude and/or predetermined airspeed, so that a commanded thrust target is interpolated as a function of the TRA from the maximum take-off thrust reference target, the maximum climb thrust reference target, and the idle thrust reference target based on current real time values of the altitude, the temperature, and the airspeed (Mach number).

10. A system comprising the EEC of embodiment 9, further comprising: a computer obtaining:

a plurality of take-off thrust setting targets in units of power during takeoff roll and a first segment of climb-out of the aircraft, including:

a TMF-FMF take-off thrust setting target determined using a TMF-FMF computing platform, as a function of the temperature comprising a runway temperature, the altitude, and the airspeed, a DPI-LSPS take-off thrust setting target determined using a DPI-LSPS computing platform as a function of the temperature comprising a runway temperature, the altitude comprising a runway altitude, and the airspeed, and wherein the TMF-FMF take-off thrust setting target and the DPI-LSPS take-off thrust setting target comprise a maximum take-off thrust setting target or a derated take-off thrust setting target;

a plurality of climb thrust setting targets in units of power during airplane climb-out, including:

a TMF-FMF climb thrust setting target determined using the TMF-FMF computing platform as a function of the temperature, the the airspeed, and the the altitude of the aircraft, a DPI-LSPS climb thrust setting target, determined using the DPI-LSPS computing platform as a function of the temperature, the airspeed, and the altitude and wherein the TMF-FMF climb thrust setting target and the DPI-LSPS climb thrust setting target comprise a maximum climb thrust setting target or a derated climb thrust setting target; and a plurality of maximum continuous thrust setting targets in units of power during airplane climb-out with Engine-Out condition, including:

a TMF-FMF maximum continuous thrust setting target determined using the TMF-FMF computing platform as a function of the temperature, the airspeed, and the altitude, and a DPI-LSPS maximum continuous thrust setting target, determined using the DPI-LSPS computing platform as a function of the temperature, the airspeed, and the altitude.

11. The system of embodiment 10, further comprising a display for an aircraft cockpit indicating the commanded lapsed take-off thrust target, the TMF-FMF take-off thrust setting target and the TMF-FMF climb thrust setting target.

12. The system of embodiment 10, further comprising a DPI-LSPS computing platform connected to the computer, wherein the DPI-LSPS computing platform determines the DPI-LSPS climb thrust setting target, the DPI-LSPS take-off thrust setting target, and a DPI-LSPS maximum continuous thrust setting target.

13. The system of embodiment 10, wherein the take-off thrust setting targets, the climb thrust setting targets and the maximum continuous thrust setting targets are determined by:

determining the maximum take-off thrust setting target as a function of the temperature, the altitude, and the airspeed;

selecting a value of the temperature and a value of the altitude when the airspeed first exceeds the lockup speed, so as to obtain a selected temperature and a selected altitude;

determining an adjustment to the maximum take-off thrust setting target as a function of the selected temperature, the selected altitude, and the altitude, and adjusting the maximum take-off thrust setting target with the adjustment to obtain an adjusted maximum take-off thrust setting target;

multiplying the adjusted maximum take-off thrust setting target obtained with a takeoff derated percentage which is determined by dispatch information, to obtain the derated take-off thrust setting target;

determining the maximum climb thrust setting target as a function of the temperature, the altitude, and airspeed;

multiplying the maximum climb thrust setting target by a climb derated percentage which is determined by the dispatch information, to obtain a derated climb thrust setting target; and determining the maximum continuous thrust setting targets as a function of the temperature, the altitude, and the airspeed.

14. The system of embodiment 10, further comprising:
a throttle having a thrust lever resolver angle, wherein:
during take-off, the TRA changes so that the commanded lapsed take-off thrust target determined in the electronic engine controller (EEC) matches the TMF-FMF take-off thrust setting target determined using the TMF-FMF computing platform; and
during a climb phase, the TRA changes so that the commanded lapsed take-off thrust target (determined in the EEC) matches the TMF-FMF climb thrust setting target or a TMF-FMF maximum continuous thrust setting target determined using the TMF-FMF computing platform.

15. An aircraft including the EEC of embodiment 9.

16. A system for controlling engine thrust of an engine, comprising: one or more computers:
obtaining an idle thrust reference target in units of power, a maximum take-off thrust reference target in units of power, and a maximum climb thrust reference target (MCL FN)in units of power;
determining an altitude lapse and/or a mach lapse for take-off based on current dispatch flight and environmental conditions, so as to obtain an adjusted (lapsed) maximum take-off thrust reference target;
adjusting the idle thrust reference target and the maximum climb thrust reference target using the altitude lapse and/or the mach lapse, so as to obtain an adjusted idle thrust reference target and an adjusted maximum climb thrust reference target;
calculating thrust setting targets including take-off thrust setting targets, climb thrust setting targets, and maximum continuous thrust setting targets; and
interpolating the adjusted idle thrust reference target, the adjusted maximum climb thrust reference target, and the adjusted (lapsed) maximum take-off thrust reference target, to obtain a commanded thrust target as a function of thrust resolver angle (TRA);
a display connected to the one or more computers, the display displaying the commanded lapsed take-off thrust target; and
a throttle having a thrust resolver angle capable of being changed to match the commanded lapsed take-off thrust target to the take-off thrust setting targets, the climb thrust setting targets, or the maximum continuous thrust setting targets; wherein the commanded thrust target is used to control thrust generated from the engine.

17. An aircraft comprising the system of embodiment 16.

18. A system for determining engine thrust of an engine, comprising:
one or more computers determining:
take-off thrust setting targets in units of power during take-off roll and a first segment of climb-out of an aircraft, including:
a TMF-FMF take-off thrust setting target determined using a TMF-FMF computing platform, as a function of a temperature comprising a runway temperature, an altitude of the aircraft, and an airspeed of the aircraft;
a DPI-LSPS take-off thrust setting target determined using a DPI-LSPS computing platform as a function of the temperature comprising the runway temperature, the altitude comprising a runway altitude, and the airspeed, and
wherein the TMF-FMF take-off thrust setting target and the DPI-LSPS take-off thrust setting target each comprise a maximum take-off thrust setting target or a derated take-off thrust setting target;
a plurality of climb thrust setting targets in units of power during airplane climb-out, including:
a TMF-FMF climb thrust setting target determined using the TMF-FMF computing platform as a function of the temperature, the airspeed, and the the altitude of the aircraft,
a DPI-LSPS climb thrust setting target, determined using the DPI-LSPS computing platform as a function of the temperature, the airspeed, and the altitude and
wherein the TMF-FMF climb thrust setting target and the DPI-LSPS climb thrust setting target each comprise a maximum climb setting target or a derated climb thrust setting target; and
a plurality of maximum continuous thrust setting targets in units of power during airplane climb-out with Engine-Out condition, including:
a TMF-FMF maximum continuous thrust setting target determined using the TMF-FMF computing platform as a function of the temperature, the airspeed, and the altitude, and
a DPI-LSPS maximum continuous thrust setting target, determined using the DPI-LSPS computing platform as a function of the temperature, the airspeed, and the altitude.

19. The system of embodiment 18, wherein the take-off thrust setting targets, the climb thrust setting targets and the maximum continuous thrust setting targets are determined by:
determining the maximum take-off thrust setting target as a function of the temperature, the altitude, and the airspeed;
selecting a value of the temperature and a value of the altitude when the airspeed first exceeds a lockup speed, so as to obtain a selected temperature and a selected altitude;
determining an adjustment to the maximum take-off thrust setting target as a function of the selected temperature, the selected altitude, and the altitude, and adjusting the maximum take-off thrust setting target with the adjustment to obtain an adjusted maximum take-off thrust setting target;
multiplying the adjusted maximum take-off thrust setting target obtained with a take-off derated percentage which is determined by dispatch information, to obtain the derated take-off thrust setting target;
determining the maximum climb thrust setting target as a function of the temperature, the altitude, and the airspeed;
multiplying the maximum climb thrust setting target by a climb derated percentage which is determined by the dispatch information, to obtain a derated climb thrust setting target; and
determining the maximum continuous thrust setting targets as a function of the temperature, the altitude, and the airspeed.

20. The system of embodiment 19, further comprising:
a display connected to the one or more computers, the display displaying a commanded lapsed take-off thrust target, the take-off thrust setting targets, the climb thrust setting targets, and the maximum continuous thrust setting targets; and
a throttle having a thrust resolver angle capable of being changed to match the commanded thrust target to the take-off thrust setting targets, the climb thrust setting targets, or the maximum continuous thrust setting targets; wherein the commanded lapsed take-off thrust target is used to control thrust generated from the engine.

As used herein, parameters or terms preceded with TMF-FMF (e.g., TMF-FMF maximum continuous thrust setting target, TMF-FMF climb thrust setting target, TMF-FMF take-off thrust setting target) are a parameter or term (e.g., maximum continuous thrust setting target, climb thrust setting target, or take-off thrust setting target) determined using a Thrust Management Function (TMF) and Flight Management Function (FMF) in a TMF-FMF computing platform implementing or executing the TMF and the FMF (e.g., in a computer such as a Flight Management Computer (FMC). Parameters or terms preceded with DPI-LSPS (e.g., DPI-LSPS maximum continuous thrust setting target, DPI-LSPS climb thrust setting target, DPI-LSPS take-off thrust setting target) are a parameter or term (e.g., maximum continuous thrust setting target, climb thrust setting target, or take-off thrust setting target) determined using a Digital Performance Information (DPI) and Low Speed Performance System (LSPS) in a DPI-LSPS computing platform implementing or executing the DPI and LSPS (e.g., in a computer).

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Technical Description

The present disclosure describes a new thrust rating architecture that can, according to one or more examples, align with the airplane development, testing and production processes so as to reduce airplane development flow time and provide opportunities that eliminate redundant calculations in the airplane systems.

The methods described herein include a lock and lapse architecture (FIG. 2) that determines the commanded power setting for any throttle position (thrust lever resolver angle, TRA) applied in the aircraft cockpit, using lapsed thrust ratios (e.g., thrust divided by maximum rated thrust) during takeoff that include adjustments to account for local ambient conditions at the time of aircraft dispatch.

Example 1

Method for Calculating Take-Off Thrust Target

Figure 1:
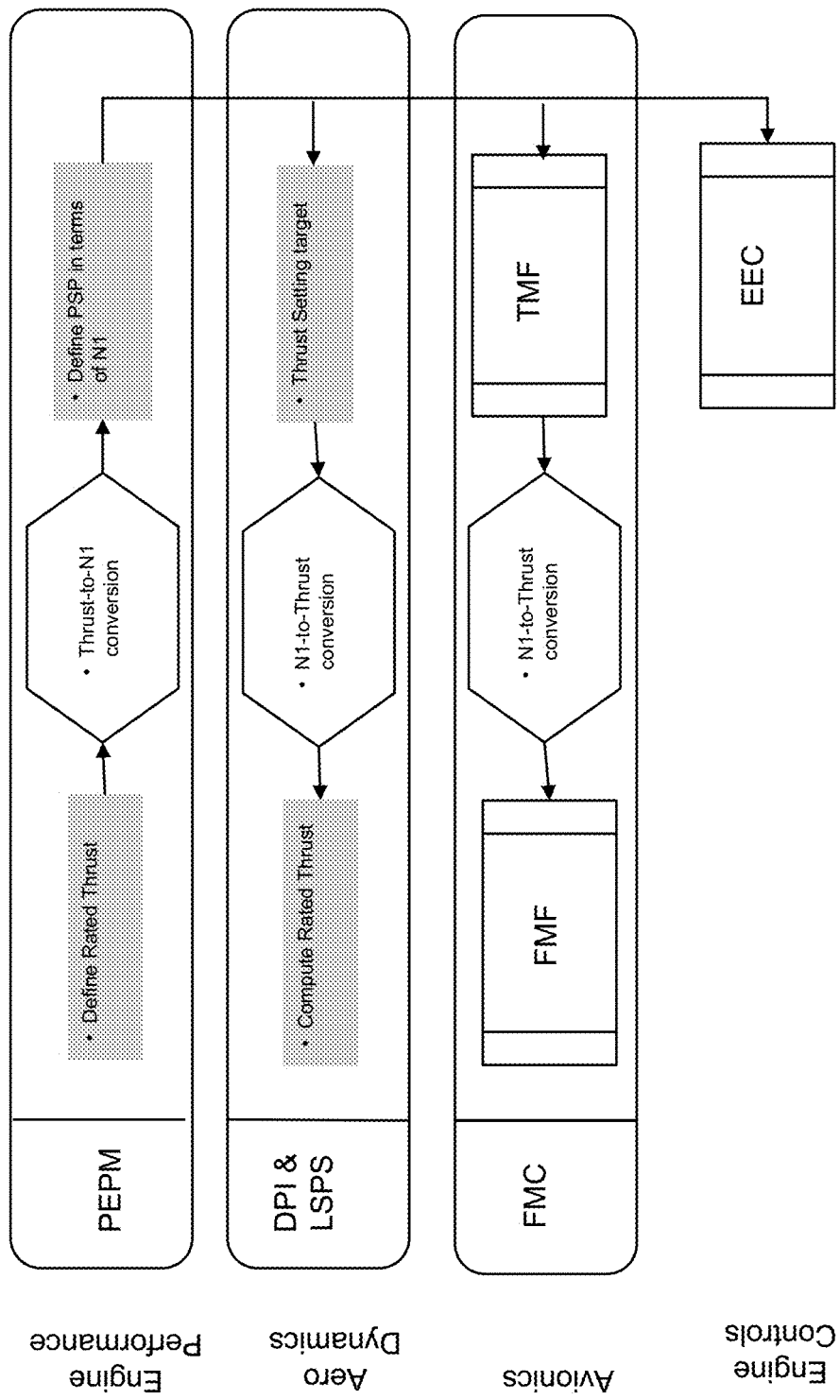
FIG. 1 illustrates a conventional thrust management architecture.
Figure 2:
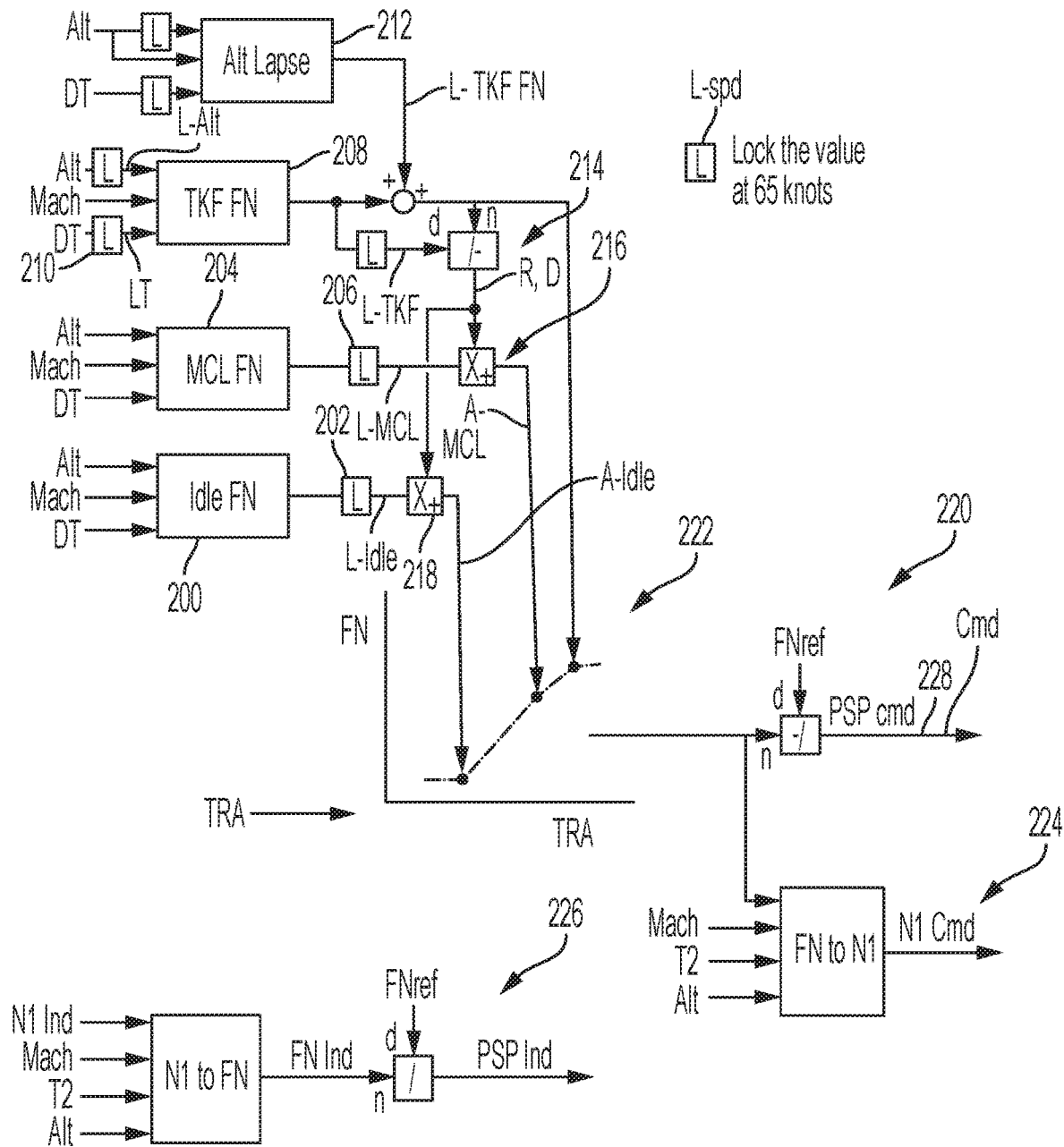
FIG. 2 illustrates a lock and lapse architecture according to one or more embodiments described herein.

FIG. 2 illustrates a method of determining a takeoff thrust target for an engine powering an aircraft. The method comprises the following steps.

Step 200 represents obtaining an idle thrust reference target (Idle FN) as a function of a temperature (DT), an airspeed (Mach number) of the aircraft, and an altitude (Alt) of the aircraft. In one or more examples, the idle thrust reference target comprises or is selected from a set of maximum idle thrust values for the engine (i.e., maximum thrust generated from the engine approved for when the engine is idling). In one or more examples, each of the maximum idle thrust values are determined for different combinations of values of the temperature, the altitude, and the airspeed, or determined for different values of the airspeed, different values the temperature, and the different values of the altitude of the aircraft as the temperature, airspeed, and/or altitude change.

Step 202 presents locking (L) the idle thrust reference target (Idle FN) at a time when the airspeed (Mach) exceeds a predetermined speed ("lockup speed" L-Spd), so as to obtain a locked idle thrust reference target (L-Idle). The locking of the idle thrust reference target comprises selecting and setting the locked idle thrust reference target comprising the one of the maximum idle thrust values determined for the temperature, the altitude, and the airspeed when the airspeed first exceeds (e.g., by 0.001 knots) the lockup speed.

Step 204 represents obtaining a maximum climb thrust reference target (MCL FN) as a function of the temperature, the airspeed, and the altitude. In one or more examples, the maximum climb thrust reference target comprises a set of maximum climb thrust values for the engine (i.e., maximum thrust generated from the engine approved for a climb phase when the aircraft is climbing). In one or more examples, each of the maximum climb thrust values are determined for different combinations of values of the temperature, the altitude, and the airspeed, or determined for the different values of the airspeed, the different values of the temperature, and the different values of the altitude as the temperature, airspeed, and/or the altitude change.

Step 206 represents locking (L) a value of the maximum climb thrust reference target when the airspeed first exceeds the lockup speed, so as to obtain a locked maximum climb thrust reference target (L-MCL). The locking of the maximum climb thrust reference target comprises selecting and setting the locked maximum climb thrust reference target comprising the one of the maximum climb thrust values determined for the temperature, the altitude, and the airspeed when the airspeed first exceeds (e.g., by 0.001 knots) the lockup speed.

Step 208 represents obtaining a maximum take-off engine thrust reference target (TKF FN) as a function of the temperature, the altitude, and the airspeed and obtaining a locked value of the maximum take-off thrust reference target ("locked maximum take-off thrust reference target" :L-TKF) when the airspeed exceeds the lockup speed. The maximum take-off thrust reference target L-TKF comprises a set of maximum take-off thrust values for the engine (i.e., maximum thrust generated from the engine approved for during a take-off phase of the aircraft),In one or more examples, each of the maximum take-off thrust values are determined for different combinations of values of the temperature, the altitude, and the airspeed, or determined for the different values of the airspeed, the different values of the temperature, and the different values of the altitude as the temperature, altitude, and airspeed change.

Step 210 represents locking the temperature and the altitude used in step 208 when the airspeed first exceeds the lockup speed, so as to obtain a locked temperature (LT) comprising a runway temperature and a locked altitude (L-Alt) comprising an altitude of a runway ("runway altitude") from which the aircraft is taking off. The locking of the values of the temperature and the altitude comprises selecting and setting the locked temperature and the locked altitude as the current real time runway temperature and the current real time runway altitude, respectively, when the airspeed first exceeds the lockup speed in step 208.

Step 212 represents, after the airspeed exceeds the lockup speed, obtaining an adjustment ("altitude lapse" or Alt Lapse) to the maximum take-off thrust reference target TKF FN as a function of the temperature DT comprising runway temperature, the altitude Alt comprising the runway altitude, and the airspeed (Mach), and adjusting the maximum take-off thrust reference target with the adjustment to obtain an adjusted (lapsed) maximum take-off reference target (L-TKF FN).

Step 214 represents dividing (/) the adjusted (lapsed) maximum take-off reference target L-TKF FN obtained in step 212 by the locked maximum take-off thrust reference target L-TKF obtained in step 208 (denominator d is L-TKF FN, numerator n is L-TKF), or determining a difference (e.g., subtraction (-)) between the adjusted (lapsed) maximum take-off reference target L-TKF-FN and the locked maximum take-off engine thrust reference target L-TKF, to obtain a thrust ratio (R) or thrust difference (D) respectively.

Step 216 represents multiplying (x) the locked maximum climb thrust reference target L-MCL obtained in step 206 by the thrust ratio R obtained in Step 214, or adding (+) the locked maximum climb thrust reference target L-MCL obtained in Step 206 to the thrust difference D obtained in Step 214, to obtain an adjusted (lapsed) maximum climb thrust reference target (A-MCL).

Step 218 represents multiplying (x) the locked idle thrust reference target L-Idle obtained in Step 202 by the thrust ratio R obtained in Step 214, or adding (+) the locked idle thrust reference target L-Idle obtained in Step 202 to the thrust difference D obtained in Step 214, to obtain an adjusted (lapsed) idle thrust reference target (A-Idle).

Step 220 represents obtaining a commanded lapsed take-off thrust target (PSP cmd) based on a setting position of a thrust lever (thrust lever resolver angle, TRA). During take-off, the TRA is changed (by pilot or autopilot) so that the commanded lapsed takeoff thrust target PSP cmd determined in an electronic engine controller (EEC) matches (or is set equal to) a TMF-FMF take-off thrust setting target determined using a TMF-FMF computing platform. During the climb phase, the TRA is changed (e.g., by the pilot or the autopilot) so that the commanded lapsed thrust target PSP cmd (determined in the EEC) matches (or is set equal to) a TMF-FMF climb thrust setting target or the TMF-FMF maximum continuous thrust setting target determined using the TMF-FMF computing platform.

As the TRA is changed, the commanded lapsed take-off thrust target PSP cmd associated with the TRA is determined by interpolating 222 between the adjusted (lapsed) maximum take-off thrust reference target L-TKF FN, the adjusted (lapsed) maximum climb thrust reference target A-MCL, and the adjusted (lapsed) idle thrust reference target A-Idle. More specifically, the interpolating generates a thrust setting target (FN) as a function of TRA, wherein the function comprises a curve passing through data points comprising the adjusted (lapsed) maximum take-off thrust reference target L-TKF FN, the adjusted (lapsed) maximum climb thrust reference target A-MCL, and the adjusted (lapsed) idle thrust reference target A-Idle. The thrust setting target FN is then divided or subtracted from a reference (e.g., maximum take-off engine thrust reference target (FN ref) to obtain the commanded lapsed take-off thrust target PSP cmd, so that the commanded lapsed takeoff thrust target PSP cmd is fraction of (or a fixed offset from) the maximum takeoff engine thrust reference target FN ref.

Step 224 represents converting (FN to N1) the commanded lapsed take-off thrust target PSP Cmd to a commanded engine rotor speed N1 Cmd (as a function of temperature DT, T2, airspeed, and altitude) used to control the actual thrust of the engine.

Step 226 represents sensing the actual engine rotor speed and converting the sensed engine rotor speed (N1 Ind) to thrust so as to indicate the actual thrust FN Ind being generated by the engine. As illustrated, FN Ind can be divided by or subtracted from the maximum takeoff engine thrust reference target FN ref to provide a reference actual thrust PSP Ind comprising a ratio (or fixed offset) from the reference maximum takeoff engine thrust reference FN ref.

Figure 9:
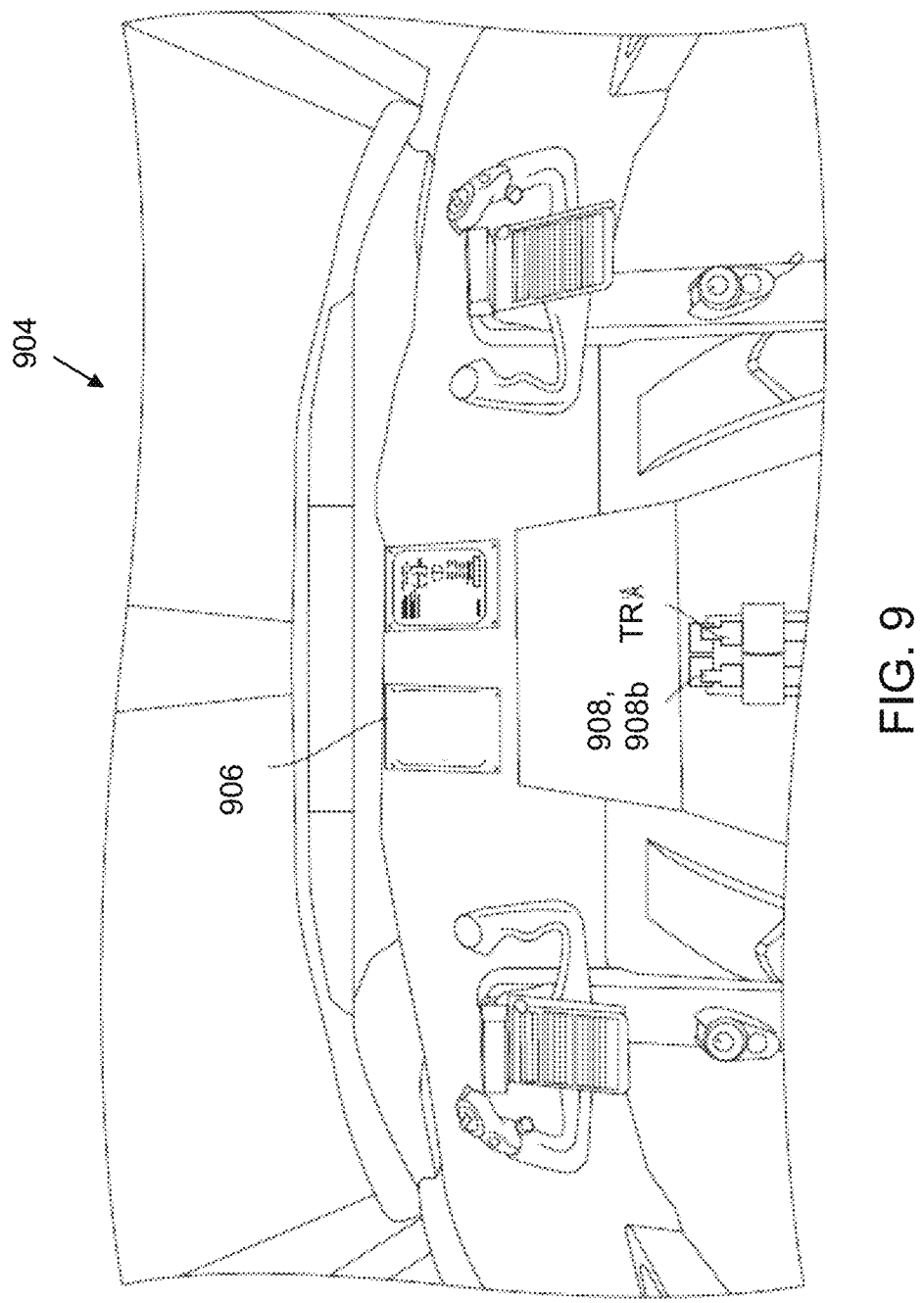
FIG. 9 illustrates an example cockpit used to implement the methods described herein.

PSP Ind, FN Ind, PSP Cmd, and TMF-FMF take-off thrust setting target can all be indicated on indicators in the aircraft's cockpit displays 906 (see FIG. 9).

Step 228 represents unlocking the values of temperature and the altitude after completion of takeoff when the aircraft exceeds a pre-determined altitude and/or a predetermined airspeed, so that, thereafter (or until another predetermined time), a commanded lapsed thrust target (Cmd) is interpolated as a function of the TRA from maximum takeoff thrust reference target TKF-FN, maximum climb reference target (MCL-FN), and idle thrust reference target (Idle FN) based on current real time values of the altitude, the temperature, and the airspeed (Mach number).

In one or more examples of FIG. 2, the airspeed, the temperature, and the altitude are variables that change or vary with time, changing weather conditions, and/or motion of the aircraft, so that the idle thrust reference target, the maximum take-off engine thrust reference target, and the maximum climb thrust reference target are updated, determined, or obtained as a function of time, as one or more of the temperature, the airspeed, or the altitude change, or as a function of the temperature, the altitude, and the airspeed. In one or more examples, the airspeed is the current airspeed or current real time airspeed as indicated on the aircraft's airspeed indicator (e.g., prior to the aircraft exceeding the pre-determined altitude and/or predetermined airspeed in step (228), the temperature comprises the current temperature (e.g, current real time runway temperature (e.g., as provided by thermometer on the aircraft) and the altitude comprises the current altitude (e.g., current real time runway altitude (e.g., as provided by a Global Positioning System (GPS) or flight control/dispatch information. In one or more examples, the lockup speed is in a range of 50-100 knots (e.g., 65 knots).

Thus, the method of FIG. 2 provides a more accurate method of determining the thrust command for a given throttle position (TRA) applied in the aircraft cockpit, calculated (during takeoff) using lapsed thrust ratios instead of adjustments to engine rotor speeds. In addition to avoiding inefficient conversion between thrust and engine rotor speed, the method is more accurate because the resulting commanded lapsed take-off thrust target includes lapses (adjustments to account for local ambient conditions) to all of the idle thrust reference target, the maximum climb thrust reference target, and maximum take-off reference target.

Example 2

Thrust Setting Target Determination

As described above, the idle engine thrust reference target Idle FN, the maximum climb thrust reference target MCL FN, and the maximum take-off engine thrust reference target TKF FN used in the method illustrated in FIG. 2 are matched to thrust setting targets PSP. The thrust setting targets are determined from a computed engine thrust needed for each of a plurality of flight phases (take-off, climb, and cruise) of the aircraft and as a function of variables comprising the temperature, the airspeed, and the altitude as defined for Example 1. In one or more examples, the thrust setting targets comprise a computed takeoff thrust setting target (MTO), a computed climb thrust setting target (MCL), and a computed maximum continuous thrust setting target (MCT).

Figure 3:
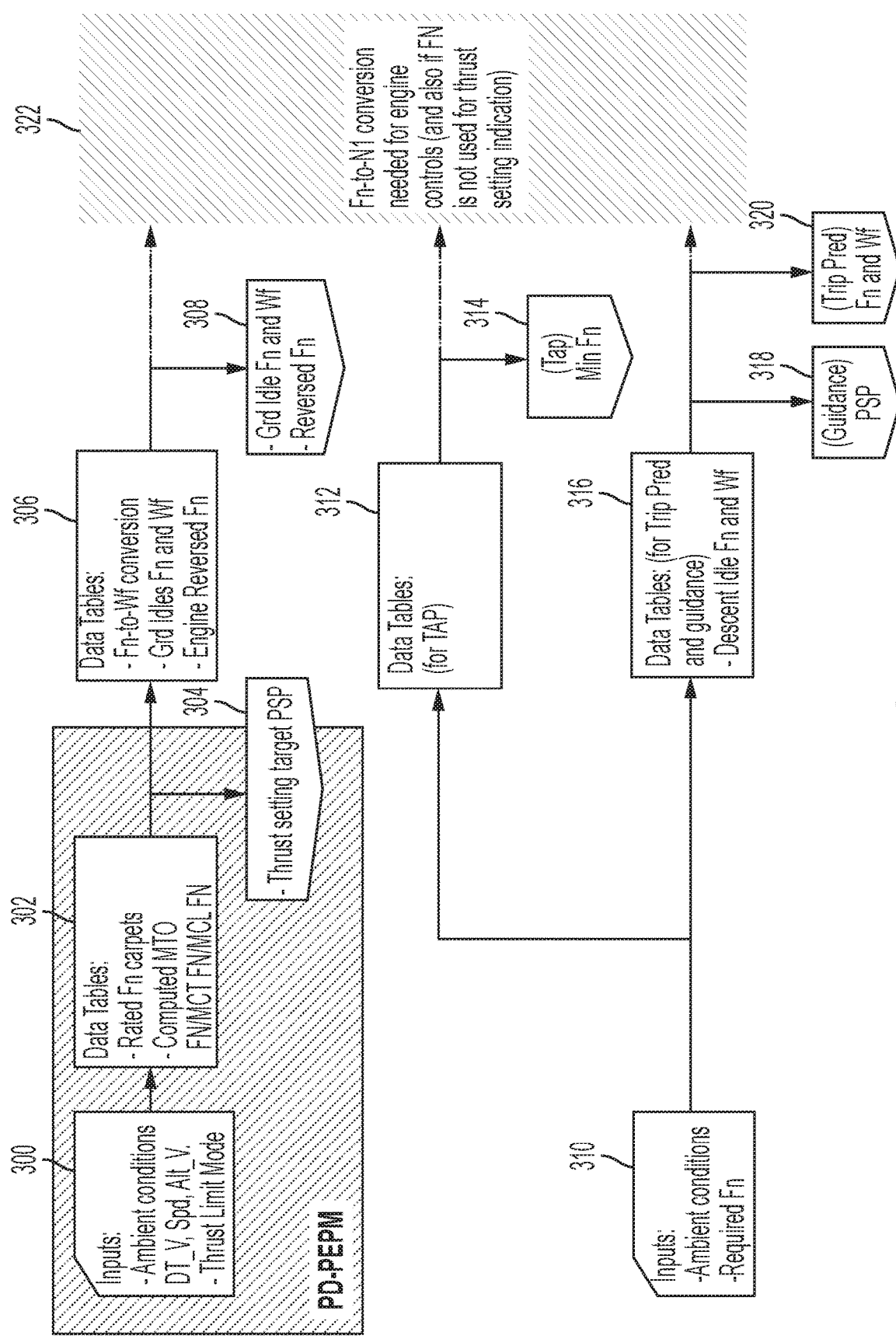
FIG. 3 illustrates data flow in a thrust management architecture according to one or more embodiments described herein.

FIG. 3 illustrates an example data flow for determining thrust setting targets and computed engine thrust.

Block 300 represents inputting, defining, or receiving a set of ambient conditions including the temperature or a set of temperature values DT_V (including current temperature), the airspeed or a set of airspeed values Spd (including current airspeed), and the altitude or a set of altitude (Alt) values Alt_V including current altitude) and a selection of thrust limit mode (i.e. climb, take-off, or cruise).

Block 302 represents determining (e.g., calculating or computing) in a computing platform:

(1) engine thrust (FN) needed for each of a plurality of the flight phases and the maximum rated thrust for each flight phase (also known as rated FN carpets).

(2) thrust setting targets using the TMF-FMF computing platform on the aircraft and a DPI-LSPS computing platform located off the aircraft. The thrust setting targets include the following.

a. Take-Off Thrust Setting Targets MTO FN-T

The takeoff thrust setting targets are determined in units of power during takeoff roll and a first segment of airplane climb-out and include:

(i) the TMF-FMF takeoff thrust setting target determined using the FMCS (Flight Management Computer Systems) computing platform, as a function of the temperature (e.g. current temperature), the altitude (e.g., current altitude), and the airspeed (e.g., current airspeed); and (ii) a DPI-LSPS takeoff thrust setting target determined using the DPI-LSPS computing platform as a function of the temperature (e.g., runway temperature), the altitude (e.g., runway altitude), and the airspeed (e.g., comprising a set of airspeed values).

The TMF-FMF take-off thrust setting target and the DPI-LSPS take-off thrust setting target comprise a maximum or a derated takeoff thrust setting target.

The takeoff thrust setting targets comprise a calculated maximum approved/rated thrust that can be generated from the engine during take-off roll and a first segment of the airplane climb out (first segment of the climb phase of the aircraft).

b. Climb Thrust Setting Targets MCL FN-T.

The climb thrust setting targets are determined in units of power during airplane climb-out, include:

(i) the TMF-FMF climb thrust setting target as a function of the temperature (e.g., current temperature), the airspeed (e.g., the current airspeed), and the altitude (e.g., current altitude); and (ii) a DPI-LSPS climb thrust setting target (e.g., comprising a set of climb thrust values for the engine) as a function of the temperature or a set of temperature values, the airspeed or a set of airspeed values, and the altitude or a set of altitude values.

The TMF-FMF climb thrust setting target and the DPI-LSPS climb thrust setting target comprise a maximum climb setting target or a derated climb setting target.

The climb thrust setting targets comprise a calculated maximum approved/rated thrust that can be generated from the engine during airplane climb out (when the aircraft is climbing after the first segment of the climb-out).

c. Maximum Continuous Thrust Setting Targets MCT FN-T

The maximum continuous thrust setting targets are determined in units of power during airplane climb-out with Engine-Out condition and include:

(i) a TMF-FMF maximum continuous thrust setting target determined using the FMCS computing platform as a function of the temperature (e.g., current temperature), the airspeed (e.g., current airspeed), and the altitude (e.g., current altitude); and (ii) a DPI-LSPS maximum continuous thrust setting target comprising a set of maximum continuous thrust values for the engine as a function the temperature (e.g., the set of temperature values), the airspeed (e.g., the set of airspeed values), and the altitude (e.g., the set of altitude values).

In one or more examples, the thrust setting targets and engine rated thrusts computed in Block 302 are stored in one or more data tables.

The derated climb thrust setting target and derated take-off thrust setting target correspond to a percentage reduction of the thrust that can be used depending on flight conditions (e.g., reduced payload may enable reduced or derated thrust settings targets). The maximum climb thrust setting target, the maximum take-off thrust setting target, and maximum continuous thrust setting target are associated with the maximum thrust that can be generated by the engine in take-off, climb, and engine out conditions respectively.

Unlike N1, the thrust setting targets PSP can be calculated at the beginning of the engine design process. This enables system software to be developed earlier as needed to support the airplane development phase, because the architectures illustrated in FIG. 2-3 eliminate existing convoluted methods that are based on the power setting target N1 (or EPR) which cannot be accurately derived until the engine thrust characteristics are finalized after the flight tests.

d. Further Steps

Figure 4:
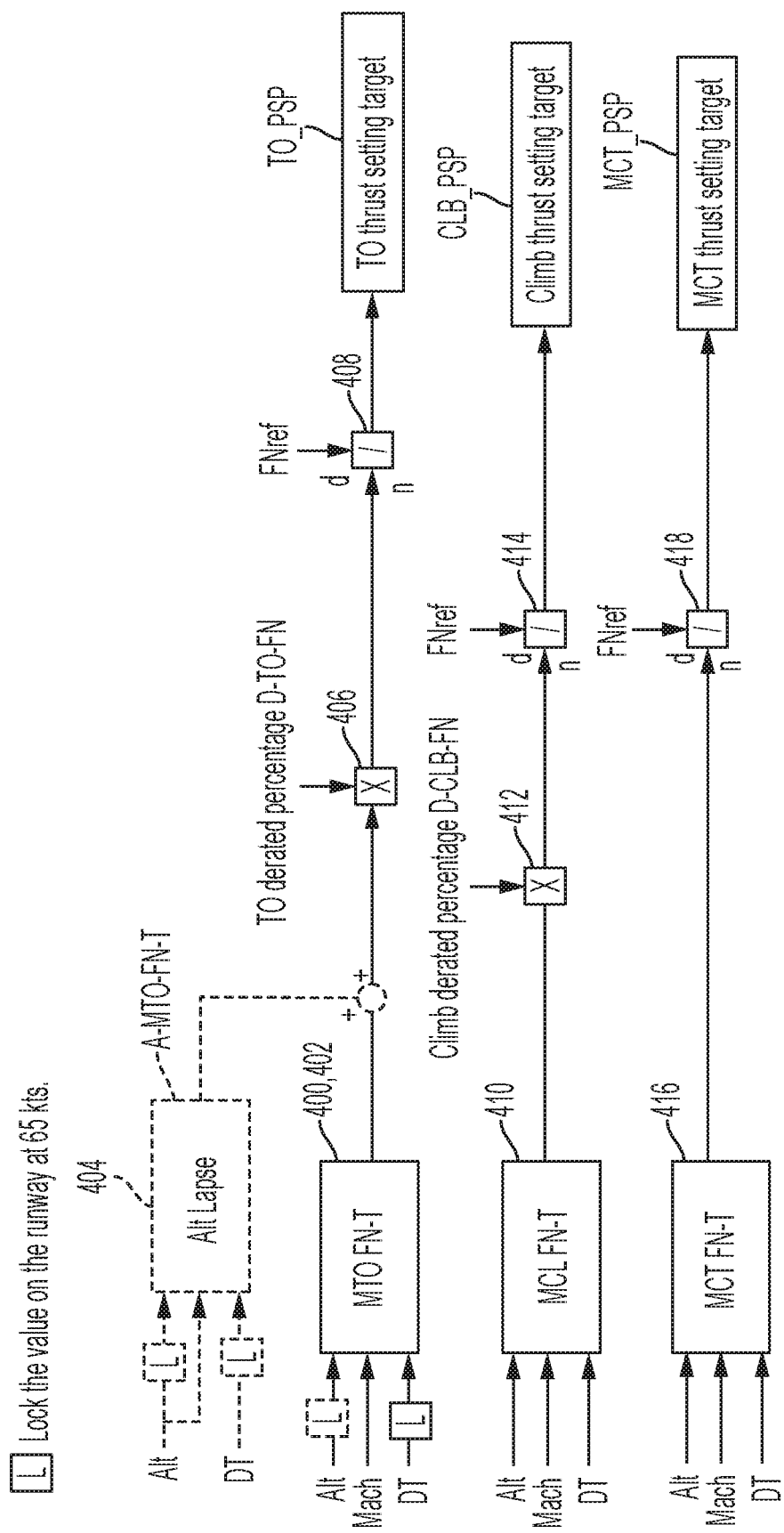
FIG. 4 is a illustrates determination of the computed engine takeoff thrust setting target, the computed climb engine thrust setting target and the computed maximum continuous engine thrust setting target, according to one or more embodiments described herein.

Block 304 represents using maximum rated thrust tables of Block 302 to generate computed engine thrust and thrust setting targets PSP, e.g., using the method of FIG. 4 (Example 3).

Block 306 represents the data needed for Block 308 calculations of fuel flow Wf data so that the fuel flow Wf needed to achieve the thrust setting targets PSP determined in block 304, ground idle thrust Grd Idle FN, and engine reversed thrust (engine reversed FN) can be determined.

Block 308 represents converting the computed engine thrusts FN of Block 304 to fuel flow Wf data (FN to Wf conversion); and determining engine ground idle thrust (Grd Idle Fn) and fuel flow Wf, and engine reversed thrust (engine reversed Fn). Block 310 represents inputting the ambient conditions and required engine thrusts Fn for thrust asymmetry protection (TAP), trip prediction, and guidance calculations.

Block 312 represents using data tables with the ambient conditions and required engine thrusts Fn from Block 310 to generate computed engine thrust setting targets for Thrust Asymmetry Protection TAP.

Block 314 represents using data tables with the ambient conditions and required engine thrusts from Block 310 to generate the minimum engine thrust (min Fn) for airplane performance calculation with TAP.

Block 316 represents data tables needed for trip prediction, guidance calculations, descent idle engine thrust Fn and fuel flow Wf.

Block 318 represents using the ambient conditions of Block 310 to generate the thrust setting target PSP for guidance Block 320 represents outputting the engine thrust and fuel flow data including at descent idle for trip prediction calculations.

Block 322 represents converting the thrust ratio PSP of Blocks 300-314 (using FN to N1 data conversion) as an engine rotor speed N1 may be needed for flight management, take off speed calculations, or other functions if thrust ratio PSP is not used for thrust setting indication.

Example 3

Thrust Setting Target Determination Process Flow

FIG. 4 is a flowchart illustrating determination (e.g., in the PEPM) of the takeoff thrust setting targets TO PSP, the climb engine thrust setting targets MCT PSP, and the maximum continuous thrust setting targets MCT PSP as a function of the temperature, the airspeed, and the altitude (defined above in Examples 1 and 2). The method comprises the following steps.

Block 400 represents determining or obtaining the maximum take-off setting target (MTO-FN-T) as a function of the temperature or set of temperature values DT_V, the altitude or set of altitude values Alt_V, and the airspeed or set of airspeed values Spd.

Block 402 represents selecting the value of the temperature (e.g., temperature value) and the value of the altitude (altitude value) when the airspeed first exceeds the lockup speed (e.g., by 0.001 knots), so as to obtain a selected temperature and a selected altitude.

Block 404 represents determining an adjustment to the maximum take-off setting target as a function of the selected temperature, the selected altitude, and the altitude (e.g., current altitude), and adjusting the maximum take-off setting target with the adjustment to obtain an adjusted maximum take-off thrust setting target (A_MTO FN-T).

Block 406 represents multiplying the adjusted maximum take-off thrust setting target obtained with a takeoff derated percentage which is determined by dispatch information, to obtain the derated take-off thrust setting target D-TO-FN.

Block 408 represents dividing the derated take-off thrust setting target by a reference thrust FN ref to obtain a take off thrust setting target TO_PSP.

Block 410 represents determining the maximum climb engine setting target (MCL-FN) as a function of the temperature or set of temperature values, the altitude or the set of altitude values, and the airspeed or the set of airspeed values.

Block 412 represents multiplying the maximum climb thrust setting target by a climb derated percentage which is determined by dispatch information, to obtain the derated climb thrust setting target D-CLB-FN.

Block 414 represents dividing the derated climb thrust setting target by a reference thrust FN ref to obtain a climb thrust setting target MCT_PSP.

Block 416 represents determining the maximum continuous thrust setting targets (MCT-FN) as a function of the temperature or the set of temperature values, the altitude or the set of altitude values, and the airspeed or the set of airspeed values.

Block 418 represents dividing the maximum continuous thrust setting target MCT-FN by a reference thrust FN ref to obtain the maximum continuous thrust setting target MCT_PSP.

Both the computed maximum climb engine thrust setting target (MCT) and the maximum continuous engine thrust setting target (MCL) are used as targets for setting thrust during the airplane climb phase. However, the maximum and derated climb (or climb engine thrust setting target) are used in all engine operation phases, whereas the maximum continuous engine thrust setting target is used only during Engine-Out (engine failure).

Takeoff and climb thrusts can be at their maximum rated thrusts (i.e. maximum takeoff thrust, maximum climb thrust) or at a derated (reduced) thrust. In case of the derated thrust, derated percentage is a term used to describe how much thrust (in % unit) is reduced from the maximum thrust.

Thus, the method of FIG. 4 provides a more accurate method of determining the thrust setting targets, calculated using lapsed thrust ratios instead of adjustments. In addition to avoiding inefficient conversion between thrust and engine rotor speed, the method provides a more accurate reflection of maximum climb thrust setting target, maximum take-off setting target, and maximum engine thrust setting target that all include adjustments to account for ambient conditions during the take-off and take-off roll phases of flight.

Example Architecture

Figure 5:
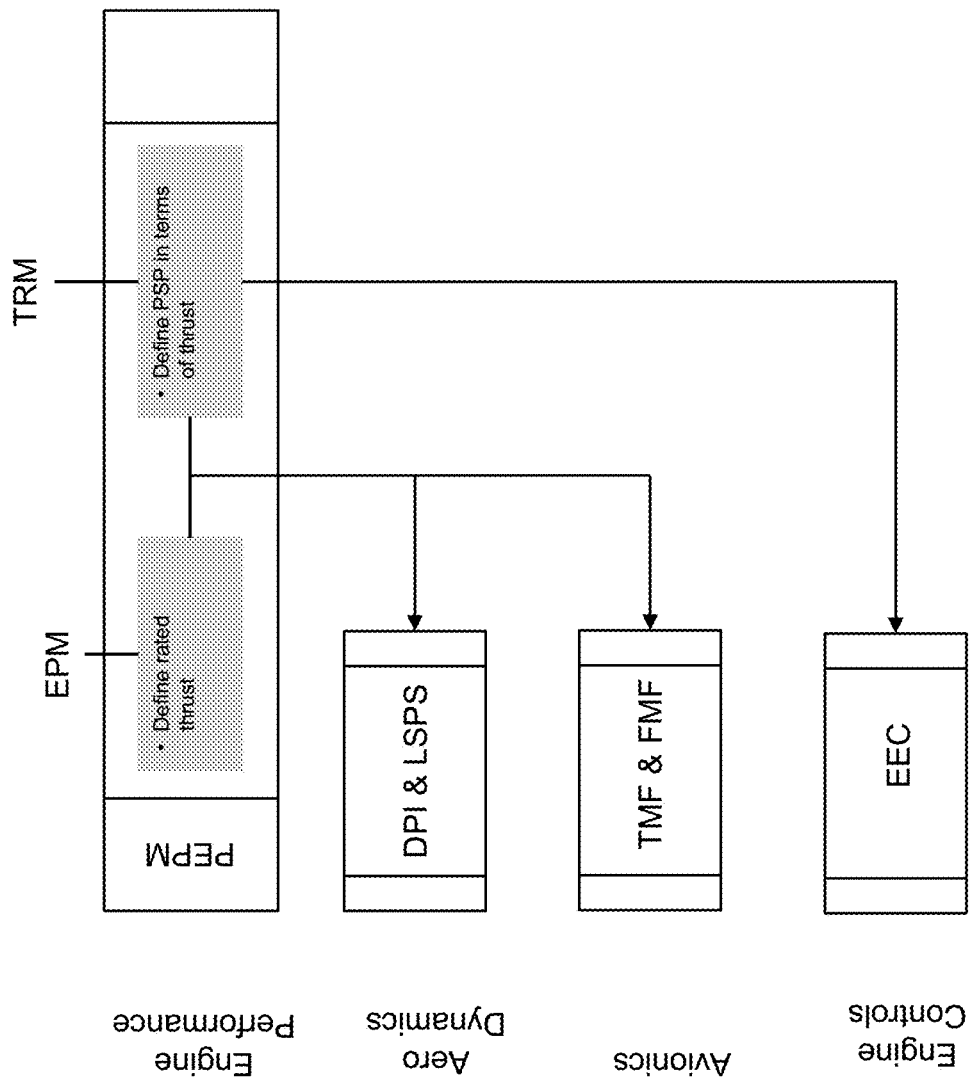
FIG. 5 illustrates a thrust management architecture (e.g., based on "Max Rated Thrust") according to one or more embodiments described herein.

FIG. 5 illustrates an architecture for implementing the methods described herein.

The PEPM comprises the EPM calculating the engine thrust and fuel flow at the computed thrust setting targets and the TRM calculating the computed thrust setting target PSP from the computed engine thrust. The PEPM further includes miscellaneous functions needed to adjust the thrust ratios for various aerodynamic and/or environmental conditions.

In one or more examples, the thrust setting targets (PSP) for each thrust limit mode (take-off, climb, and cruise thrust ratings) during a flight of the aircraft are determined according to dispatch information and in-flight airplane performance prediction obtained from Airplane Flight Manual—Digital Performance Information (DPI), Low Speed Performance System (LSPS), Thrust Management Function (TMF) and Flight Management Function (FMF).

Example Flight and Engine Control

The thrust ratio data obtained using the method and systems illustrated in FIGS. 2-6 can be used to set the throttle position during flight and/or take-off of the aircraft. For example, a pilot can use the linear thrust ratio data to allow constant engine thrust derated percentage to be set at a fixed throttle position. This enables more efficient and accurate engine thrust control for both takeoff and climb ratings. In conventional methods, the pilot initially sets the thrust lever (TRA) and then may have to continually adjust the lever to maintain selected climb thrust during climb out.

Figure 6:
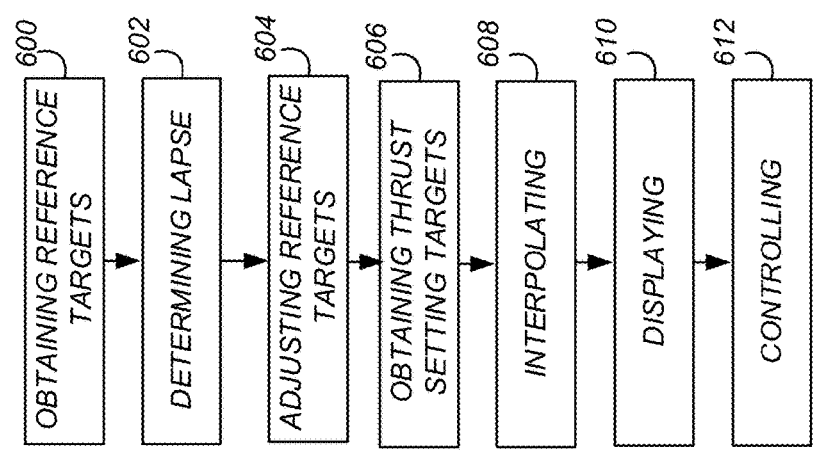
FIG. 6 is a flowchart illustrating a method for controlling engine thrust, according to one or more embodiments described herein.

FIG. 6 is a flowchart illustrating a method for controlling engine takeoff thrust. The method comprises the following steps.

Block 600 represents obtaining an idle thrust reference target, a maximum take-off thrust reference target, and a maximum climb thrust reference target in units of power (e.g., in a computer such as an EEC).

Block 602 represents determining an altitude lapse and/or mach lapse for takeoff based on current dispatch flight and environmental conditions (e.g., in a computer such as an EEC).

Block 604 represents adjusting the idle reference target, the maximum take-off thrust reference target, and the maximum climb reference target using the altitude lapse and/or the mach lapse, so as to obtain an adjusted idle thrust reference target, an adjusted maximum take-off thrust reference target, and an adjusted maximum climb thrust reference target (e.g., in a computer such as an EEC).

Block 606 represents calculating thrust setting targets including takeoff thrust setting targets, climb thrust setting targets, and maximum continuous thrust setting targets (e.g., in a computer such as a TMF-FMF computing platform or a DPI-LSPS computing platform).

Block 608 represents interpolating the adjusted idle thrust reference target, the adjusted maximum climb thrust reference target. the adjusted maximum take-off thrust reference target, to obtain a commanded thrust as a function of thrust resolver angle (TRA) (e.g., in a computer such as an EEC).

Block 610 represents displaying (e.g., in the cockpit) the commanded thrust target (e.g., as a ratio or offset from a reference), the takeoff thrust setting target(s) (e.g., as a ratio or offset from a reference), climb thrust setting target(s) (e.g., as a ratio or offset from a reference), and maximum continuous thrust setting target(s) (e.g., as a ratio or offset from a reference), so that the TRA can be changed to match the commanded thrust to the takeoff thrust setting targets, the climb thrust setting targets, or the maximum continuous thrust setting targets.

Block 612 represents using/transmitting the commanded thrust target to the EEC so as to control thrust generated from the engine.

In one or more examples, the aircraft cockpit includes a power plant indicator to indicate thrust, or a parameter that is directly related to thrust, to the pilot. The indicator is based on the direct measurement of thrust or parameters that are directly related to thrust. The indicator indicates a change in thrust resulting from any engine malfunction, damage, or deterioration.

Example Engine

Figure 7:
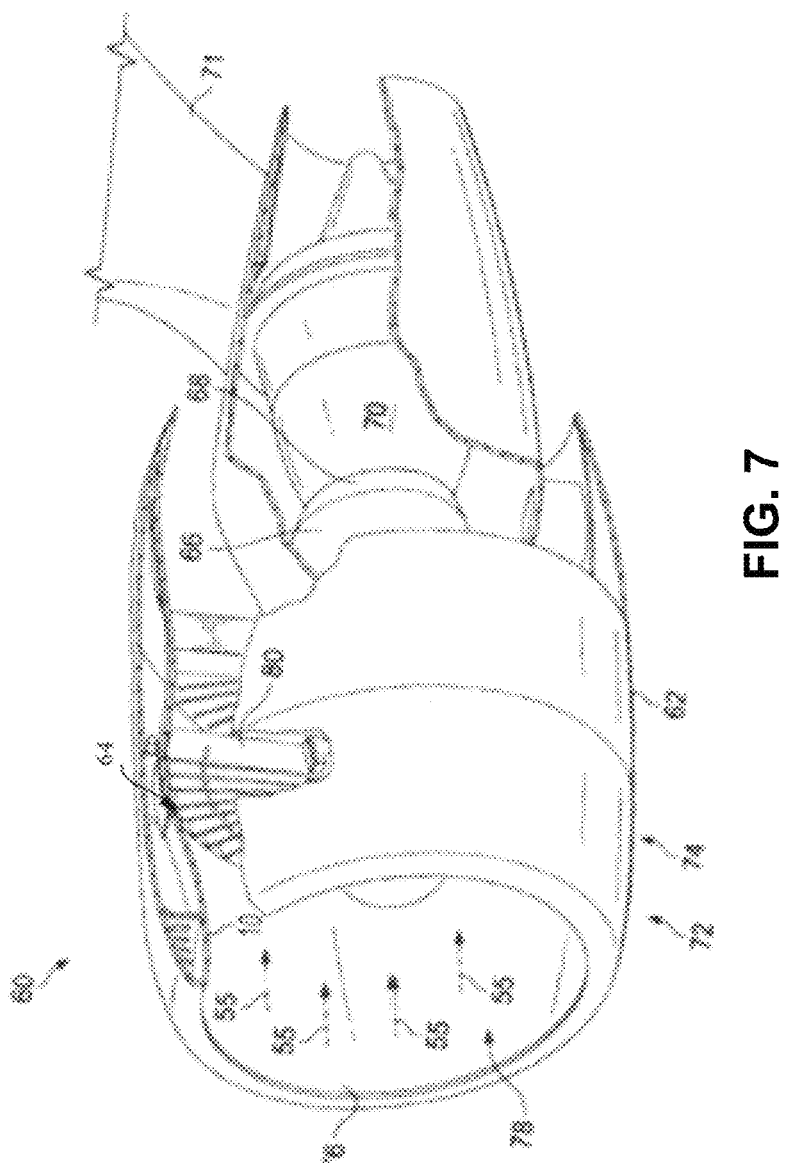
FIG. 7 illustrates an example engine having a thrust commanded using the methods and systems described herein.

FIG. 7 is a schematic view of an exemplary aircraft engine pod 60 comprising an engine 60a. Engine pod 60 includes a nacelle 62, a fan 64, a compressor 66, a combustor 68, and a turbine 70. Engine pod 60 is typically attached to the wings or fuselage of an aircraft through appropriate mountings, for example, a pylon 71. Nacelle 62 includes an engine inlet 72 having an outer barrel 74 and an inner barrel 76, and a lip section joining the two. In the exemplary implementation, the inner barrel 76, along with a lip section, defines an air intake duct 78 for supplying air 55 to the fan 64, which subsequently is directed both to the bypass duct and engine core, comprising the compressor 66, combustor 68 and turbine 70. Air drawn by fan into the fan duct is exhausted as exhaust gas that provides a first component of thrust from the engine. Air drawn by the fan into the engine core is compressed in the compressor to form compressed air. The compressed air is used to burn fuel in the combustor and converted to exhaust gases outputted through the turbine and through a gas path to a nozzle. The nozzle accelerates the exhaust gases from the engine core to sonic speed to maximize this second component of thrust generated From the engine.

Figure 8:
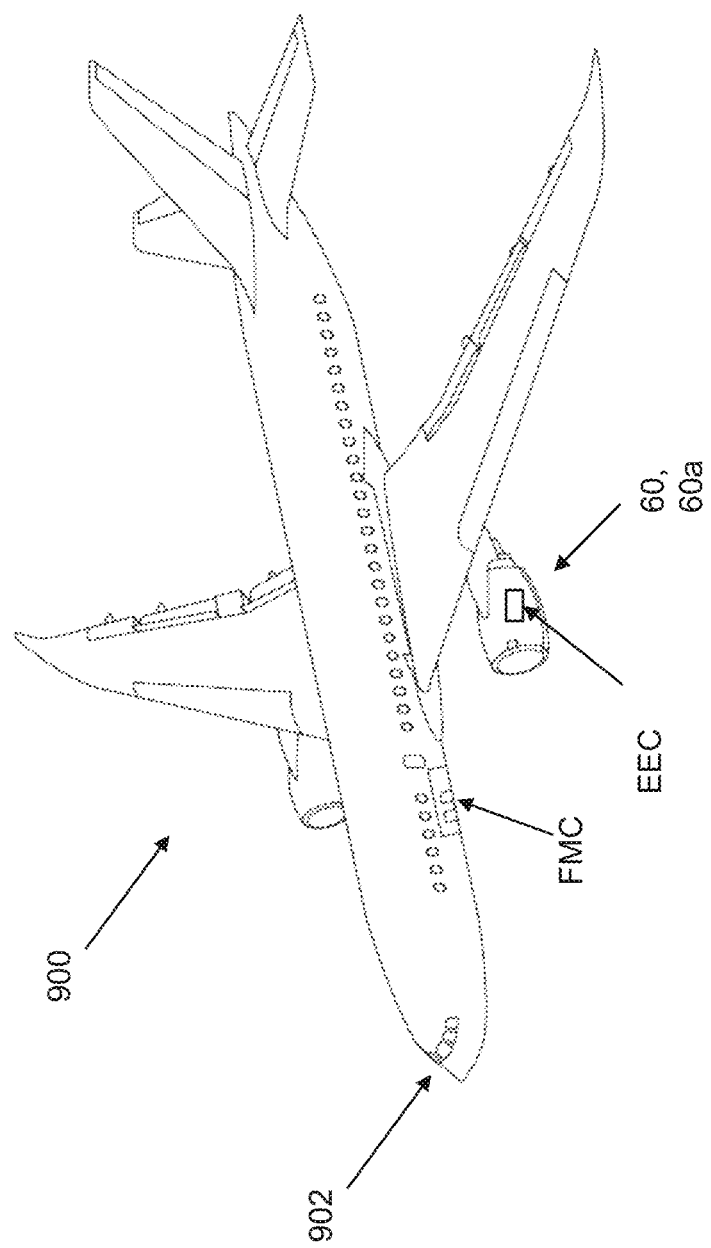
FIG. 8 illustrates an example aircraft propelled by the engine illustrated in FIG. 7.

FIG. 8 is a schematic view of an aircraft 900 propelled by the engine 60. The aircraft 900 includes a cockpit 902 including one or more displays and one or more computers or computing platforms (e.g., EEC and TMF-FMF computing platforms) connected to the display for controlling the aircraft 900.

FIG. 9 illustrates the cockpit 904 including the displays 906 indicating the commanded lapsed takeoff thrust target, the commanded lapsed thrust target (Cmd), the TMF-FMF take-off thrust setting targets (maximum or derated) and the TMF-FMF climb thrust setting targets (maximum or derated). Also shown is the throttle 908 (or thrust lever 908b) and the TRA. The TRA is the angle of the throttle 908 or thrust lever 908b with respect to a reference and each angle is associated with a different thrust so that the TRA determines the thrust commanded to the engine. As described herein, during take-off, the TRA is changed (by pilot or autopilot) so that the commanded lapsed takeoff thrust target determined in the EEC matches (or is set equal to) a TMF-FMF take-off thrust setting target determined using a computer (e.g., TMF-FMF computing platform); and during the climb phase, the TRA is changed (e.g., by the pilot or the autopilot) so that the commanded thrust target (determined in the EEC) matches (or is set equal to) a TMF-FMF climb thrust setting target or the TMF-FMF maximum continuous thrust setting target determined using the computer (e.g., TMF-FMF computing platform).

Advantages and Improvements

Embodiments of the architectures illustrated herein enable one or more of the following.

1. The removal of the PEPM software development from the critical path of the airplane development, testing and production processes.

2. The elimination of redundant calculations between systems.

3. The simplification of conventional lock and lapse logic and the throttle interpolation calculation for derated takeoff and derated climb ratings.

4. Inclusion of takeoff thrust bumps in the based runway rated takeoff thrust without interference with the variable "Break Point" temperatures and the altitude lapse during airplane climb-out.

5. Commonality of the cockpit thrust limit display for different engine types and EEC operating modes (i.e. primary versus reversionary).

6. Simplification of control logic and/or optimized engine performance and engine life.

7. Simplification of the PEPM software interface and validation process.

8. Simplification of PEPM logic for trip prediction (mission) and guidance.

9. Elimination of N1-to-thrust conversion in the PEPM.

10. Elimination of Thrust-to-N1 conversion in the thrust rating calculation (or defer to the end of the process if thrust ratio is not used for thrust setting indication).

11. Engine performance calculation based on required engine thrust FN, wherein the actual engine thrust is directly computable as a function of Thrust Resolver Angle TRA (throttle setting).

12. Adjustments for Mach lapse and altitude lapse based on thrust can be inputted to the control earlier in the engine control logic.

13. Flight Deck Display of parameters such as of percentage of maximum thrust, instead of conventional N1/EPR.

14. Simplified engine control required to achieve constant throttle setting position during the second and third climb-out segments for max climb rating or derated climb rating, simplifying control for the pilot.

Processing Environment

Figure 10:
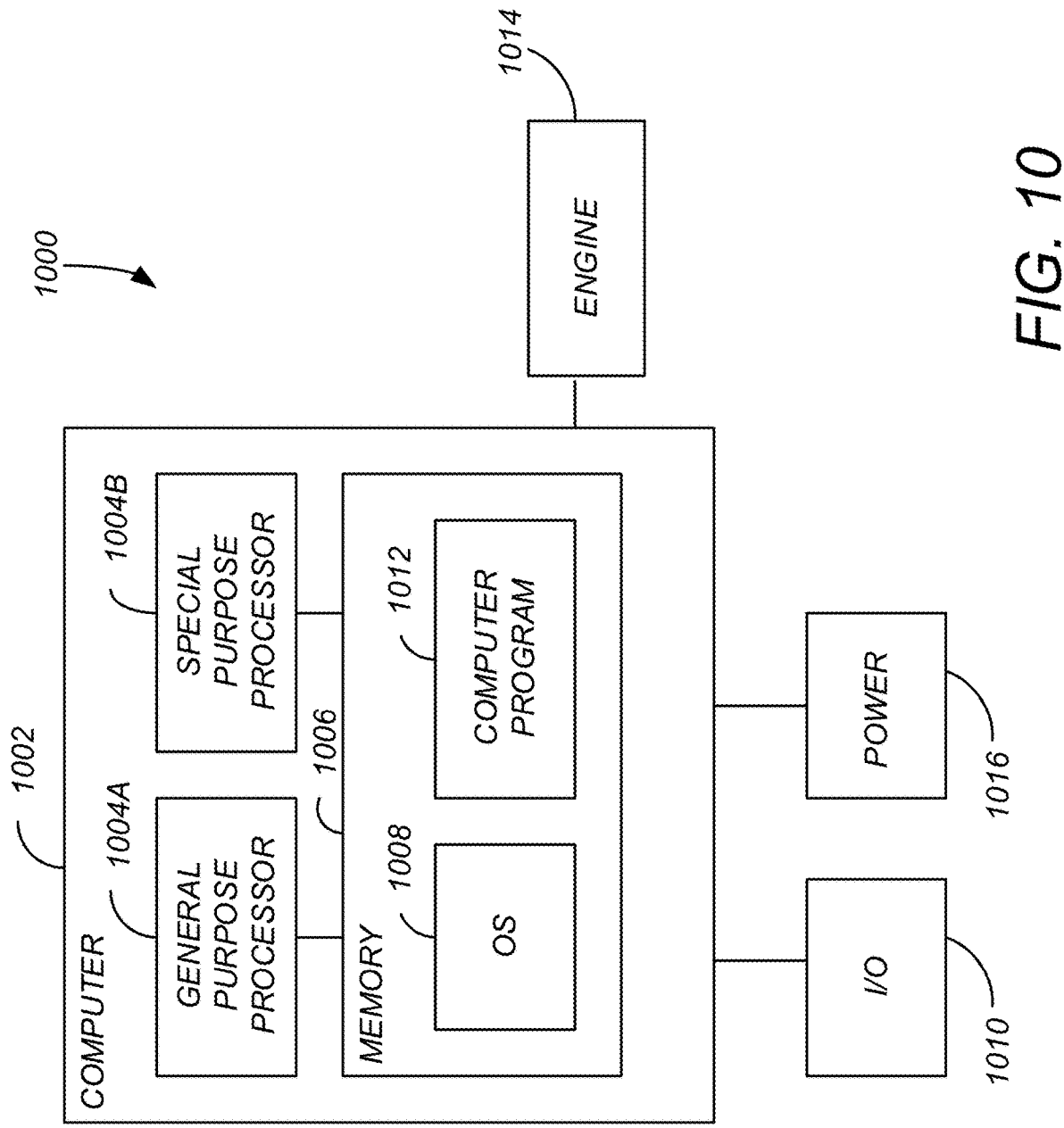
FIG. 10 illustrates an example hardware environment.

FIG. 10 illustrates an exemplary system 1000 (e.g., EEC, PEPM) used to implement processing elements needed to control the engines described herein.

The computer 1002 comprises a processor 1004 (general purpose processor 1004A and special purpose processor 1004B) and a memory, such as random access memory (RAM) 1006. Generally, the computer 1002 operates under control of an operating system 1008 stored in the memory 1006, and interfaces with the user/other computers to accept inputs and commands (e.g., analog or digital signals) and to present results through an input/output (I/O) module 1010. The computer program application 1012 (e.g., DPI-LSPS computing platform or TMF-FMF computing platform) accesses and manipulates data stored in the memory 1006 of the computer 1002. The operating system 1008 and the computer program 1012 are comprised of instructions which, when read and executed by the computer 1002, cause the computer 1002 to perform the operations and/or methods herein described. In one embodiment, instructions implementing the operating system 1008 and the computer program 1012 are tangibly embodied in the memory 1006, thereby making one or more computer program products or articles of manufacture capable of performing the methods described herein (e.g., as described in FIGS. 2-6). As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

Example System Embodiments

A system, one or more computers, or one or more computer software applications implementing the methods described herein can be embodied in many ways including, but not limited to, the following.

1. An Electronic Engine Controller (EEC), comprising:

a processor 1004:

(a) obtaining an idle thrust reference target (Idle FN) as a function of a temperature (DT), an airspeed (Mach) of an aircraft (900), and an altitude (Alt) of the aircraft (900);

(b) locking the idle thrust reference target (Idle FN) at a time when the airspeed (Mach) exceeds a predetermined speed comprising a lockup speed, so as to obtain a locked idle thrust reference target (L-Idle);

(c) obtaining a maximum climb thrust reference target (MCL FN) as a function of the temperature (DT), the airspeed (Mach), and the altitude (Alt);

(d) locking a value of the maximum climb thrust reference target (MCL FN) when the airspeed exceeds the lockup speed, so as to obtain a locked maximum climb thrust reference target (L-MCL);

(e) obtaining a maximum take-off thrust reference target (TKF FN) as a function of the temperature (DT), the altitude (Alt), and the airspeed and obtaining a locked value of the maximum take-off thrust reference target (TKF FN), comprising a locked maximum take-off thrust reference target (L-TKF), when the airspeed exceeds the lockup speed;

(f) locking the temperature (DT) and the altitude (Alt) used in (e) when the airspeed exceeds the lockup speed, so as to obtain a locked temperature (LI) comprising a runway temperature and a locked altitude (Alt) comprising an altitude (Alt) of a runway from which the aircraft (900) is taking off;

(g) after the airspeed exceeds the lockup speed, obtaining an adjustment ("altitude lapse") to the maximum take-off thrust reference target (TKF FN) as a function of the runway temperature, the altitude (Alt) of the runway, and the airspeed, and adjusting the maximum take-off thrust reference target (TKF FN) with the adjustment to obtain an adjusted (lapsed) maximum take-off thrust reference target (L-TKF FN);

(h) dividing the adjusted (lapsed) maximum take-off thrust reference target (L-TKF FN) obtained in (g) by the locked maximum take-off thrust reference target (L-TKF) obtained in (e), or determining a difference between the adjusted (lapsed) maximum take-off thrust reference target (L-TKF FN) and the locked maximum take-off thrust reference target (L-TKF), to obtain a thrust ratio (R) or thrust difference (D) respectively;

(i) multiplying the locked maximum climb thrust reference target (L-MCL) obtained in (d) by the thrust ratio (R) obtained in (h), or adding the locked maximum climb thrust reference target (L-MCL) obtained in (d) to the thrust difference (D) obtained in (h), to obtain an adjusted (lapsed) maximum climb thrust reference target (A-MCL);

(j) multiplying the locked idle thrust reference target (L-Idle) obtained in (b) by the thrust ratio obtained in (h), or adding the locked idle thrust reference target (L-Idle) obtained in (b) to the thrust difference obtained in (h), to obtain an adjusted (lapsed) idle thrust reference target (A-Idle);

(k) obtaining a commanded lapsed take-off thrust target (PSP cmd) based on a setting position of a thrust lever 908b (thrust lever resolver angle, TRA) by interpolating between the adjusted (lapsed) maximum take-off thrust reference target (L-TKF FN), the adjusted (lapsed) maximum climb thrust reference target (A-MCL), and the adjusted (lapsed) idle thrust reference target (A-Idle), wherein the commanded lapsed take-off thrust target (PSP Cmd) is a fraction of (or a fixed offset from) the maximum take-off thrust reference target (TKF FN); and (l) unlocking the values of temperature (DT) and the altitude (Alt) after completion of take-off when the aircraft (900) exceeds a pre-determined altitude (Alt) and/or predetermined airspeed, so that a commanded lapsed thrust target (Cmd) is interpolated as a function of the TRA from the maximum take-off thrust reference target (TKF FN), the maximum climb thrust reference target (MCL FN), and the idle thrust reference target (Idle FN) based on current real time values of the altitude (Alt), the temperature (DT), and the airspeed (Mach number).

2. A system 1000 comprising the EEC of embodiment 1, further comprising: a computer 1002 obtaining:
- a plurality of take-off thrust setting targets (MTO FN-T) in units of power during take-off roll and a first segment of climb-out of the aircraft (900), including:
  - a TMF-FMF take-off thrust setting target determined using a TMF-FMF computing platform, as a function of the temperature (DT) comprising a runway temperature, the altitude (Alt), and the airspeed,
  - a DPI-LSPS take-off thrust setting target determined using a DPI-LSPS computing platform as a function of the temperature (DT) comprising a runway temperature (DT), the altitude (Alt) comprising a runway altitude, and the airspeed, and
  - wherein the TMF-FMF take-off thrust setting target and the DPI-LSPS take-off thrust setting target comprise a maximum take-off thrust setting target or a derated take-off thrust setting target;
- a plurality of climb thrust setting targets (MCT FN-T, CLB_PSP) in units of power during airplane climb-out, including:
  - a TMF-FMF climb thrust setting target determined using the TMF-FMF computing platform as a function of the temperature (DT), the the airspeed, and the the altitude (Alt) of the aircraft (900),
  - a DPI-LSPS climb thrust setting target, determined using the DPI-LSPS computing platform as a function of the temperature (DI), the airspeed, and the altitude (Alt) and
  - wherein the TMF-FMF climb thrust setting target and the DPI-LSPS climb thrust setting target comprise a maximum climb thrust setting target or a derated climb thrust setting target; and
- a plurality of maximum continuous thrust setting targets (MCT FN-T, MCT_PSP) in units of power during airplane climb-out with Engine-Out condition, including:
  - a TMF-FMF maximum continuous thrust setting target determined using the TMF-FMF computing platform as a function of the temperature (DI), the airspeed, and the altitude (Alt), and
  - a DPI-LSPS maximum continuous thrust setting target, determined using the DPI-LSPS computing platform as a function of the temperature (DT), the airspeed, and the altitude (Alt).

3. The system of embodiment 2, further comprising a display (906) for an aircraft (900) cockpit 904 indicating the commanded lapsed take-off thrust target (PSP cmd), the TMF-FMF take-off thrust setting target and the TMF-FMF climb thrust setting target.

4. The system 1000 of embodiment 2, further comprising a DPI-LSPS computing platform connected to the computer 1002, wherein the DPI-LSPS computing platform determines the DPI-LSPS climb thrust setting target, the DPI-LSPS take-off thrust setting target, and a DPI-LSPS maximum continuous thrust setting target.

5. The system 1000 of embodiment 2, wherein the take-off thrust setting targets (MTO FN-T), the climb thrust setting targets (MCL FN-T) and the maximum continuous thrust setting targets are determined by:
- determining the maximum take-off thrust setting target (MTO FN-T) as a function of the temperature (DT), the altitude (Alt), and the airspeed;
- selecting a value of the temperature (DT) and a value of the altitude (Alt) when the airspeed first exceeds the lockup speed, so as to obtain a selected temperature and a selected altitude;
- determining an adjustment to the maximum take-off thrust setting target (MTO FN-T) as a function of the selected temperature, the selected altitude, and the altitude (Alt), and adjusting the maximum take-off thrust setting target with the adjustment to obtain an adjusted maximum take-off thrust setting target A-MTO-FN-T);
- multiplying the adjusted maximum take-off thrust setting target A-MTO-FN-T) obtained with a takeoff derated percentage (D-TO FN) which is determined by dispatch information, to obtain the derated take-off thrust setting target (TO_PSP);
- determining the maximum climb thrust setting target (MCL FN-T) as a function of the temperature (DT), the altitude (Alt), and airspeed (Mach);
- multiplying the maximum climb thrust setting target (MCL FN-T) by a climb derated percentage (D-CLB-FN) which is determined by the dispatch information, to obtain a derated climb thrust setting target (CLB_PSP); and
- determining the maximum continuous thrust setting targets (MCT FN-T) as a function of the temperature (DT), the altitude (Alt), and the airspeed (Mach).

6. The system 1000 of embodiment 2, further comprising:
- a throttle (908) having a thrust lever resolver angle (TRA), wherein:
  - during take-off, the TRA changes so that the commanded lapsed take-off thrust target (PSP Cmd) determined in the electronic engine controller (EEC) matches the TMF-FMF take-off thrust setting target determined using the TMF-FMF computing platform; and
  - during a climb phase, the TRA changes so that the commanded lapsed take-off thrust target (determined in the EEC) matches the TMF-FMF climb thrust setting target or a TMF-FMF maximum continuous thrust setting target determined using the TMF-FMF computing platform.

7. An aircraft (900) including the EEC of embodiment 1.

8. A system 1000 for controlling engine thrust of an engine 60*a*, comprising: one or more computers (1002):
- obtaining an idle thrust reference target (Idle FN) in units of power, a maximum take-off thrust reference target (TKF FN) in units of power, and a maximum climb thrust reference target (MCL FN) in units of power;
- determining an altitude lapse (Alt lapse) and/or a mach lapse for take-off based on current dispatch flight and environmental conditions, so as to obtain an adjusted (lapsed) maximum take-off thrust reference target (L-TKF FN);
- adjusting the idle thrust reference target (Idle FN) and the maximum climb thrust reference target (MCL FN) using the altitude lapse and/or the mach lapse, so as to obtain an adjusted idle thrust reference target (A-Idle) and an adjusted maximum climb thrust reference target (A-MCL);
- calculating thrust setting targets including take-off thrust setting targets (MTO FN-T, TO_PSP), climb thrust setting targets (CLB_PSP, MCL FN-T), and maximum continuous thrust setting targets (MCT FN-T, MCT_PSP); and
- interpolating the adjusted idle thrust reference target (A-Idle), the adjusted maximum climb thrust reference target (A-MCL), and the adjusted (lapsed) maximum take-off thrust reference target (L-TKF FN), to obtain a commanded lapsed take-off thrust target (PSP Cmd) as a function of thrust resolver angle (TRA);
- a display (906) connected to the one or more computers (1002), the display (906) displaying the commanded lapsed take-off thrust target (PSP Cmd); and a throttle (908) having a thrust resolver angle (TRA) capable of being changed to match the commanded lapsed take-off thrust target (PSP Cmd) to the take-off thrust setting targets (MTO FN-T_, the climb thrust setting targets (A-MCL), or the maximum continuous thrust setting targets (MCT FN-T); wherein the commanded lapsed take-off thrust target (PSP Cmd) is used to control thrust generated from the engine (60*a*).

9. An aircraft (900) comprising the system of embodiment 8.

10. A system 1000 for determining engine thrust of an engine 60*a*, comprising:
  one or more computers 1002 determining:
    take-off thrust setting targets (MTO FN-T, TO_PSP) in units of power during take-off roll and a first segment of climb-out of an aircraft (900), including:
      a TMF-FMF take-off thrust setting target determined using a TMF-FMF computing platform, as a function of a temperature comprising a runway temperature, an altitude (Alt) of the aircraft (900), and an airspeed of the aircraft (900),
      a DPI-LSPS take-off thrust setting target determined using a DPI-LSPS computing platform as a function of the temperature comprising the runway temperature, the altitude (Alt) comprising a runway altitude, and the airspeed, and
      wherein the TMF-FMF take-off thrust setting target and the DPI-LSPS take-off thrust setting target each comprise a maximum take-off thrust setting target or a derated take-off thrust setting target;
    a plurality of climb thrust setting targets (MCL FN-T, CLB_PSP) in units of power during airplane climb-out, including:
      a TMF-FMF climb thrust setting target determined using the TMF-FMF computing platform as a function of the temperature, the airspeed, and the altitude of the aircraft (900),
      a DPI-LSPS climb thrust setting target, determined using the DPI-LSPS computing platform as a function of the temperature, the airspeed, and the altitude (Alt) and
      wherein the TMF-FMF climb thrust setting target and the DPI-LSPS climb thrust setting target each comprise a maximum climb setting target or a derated climb setting target; and
    a plurality of maximum continuous thrust setting targets (MCL FN-T, MCT_PSP) in units of power during airplane climb-out with Engine-Out condition, including:
      a TMF-FMF maximum continuous thrust setting target determined using the TMF-FMF computing platform as a function of the temperature, the airspeed, and the altitude (Alt), and
      a DPI-LSPS maximum continuous thrust setting target, determined using the DPI-LSPS computing platform as a function of the temperature (DT), the airspeed (Mach), and the altitude (Alt).

11. The system 1000 of embodiment 10, wherein the take-off thrust setting targets (TO_PSP, MTO FN-T), the climb thrust setting targets (CLB_PSP, MCL FN-T) and the maximum continuous thrust setting targets (MCT_PSP, MCT FN-T) are determined by:
  determining the maximum take-off thrust setting target (MTO FN-T) as a function of the temperature (DT), the altitude (Alt), and the airspeed (Mach);
  selecting a value of the temperature (DT) and a value of the altitude (Alt) when the airspeed first exceeds a lockup speed, so as to obtain a selected temperature and a selected altitude;
  determining an adjustment to the maximum take-off thrust setting target (MTO FN-T) as a function of the selected temperature, the selected altitude, and the altitude (Alt), and adjusting the maximum take-off thrust setting target with the adjustment to obtain an adjusted maximum take-off thrust setting target (A-MTO-FN-T);
  multiplying the adjusted maximum take-off thrust setting target (A-MTO-FN-T) obtained with a take-off derated percentage (D-TO-FN) which is determined by dispatch information, to obtain the derated take-off thrust setting target (TO_PSP), wherein the derated take-off thrust setting target may or may not be divided by FN ref to obtain a ratio;
  determining the maximum climb thrust setting target (MCL FN-T) as a function of the temperature, the altitude (Alt), and the airspeed;
  multiplying the maximum climb thrust setting target (MCL FN-T) by a climb derated percentage (D-CLB-FN) which is determined by the dispatch information, to obtain a derated climb thrust setting target (CLB_PSP), wherein the derated climb thrust setting target may or may not be divided by FN ref to obtain a ratio; and
  determining the maximum continuous thrust setting targets (MCT FN-T, MCT_PSP) as a function of the temperature, the altitude (Alt), and the airspeed, wherein the maximum continuous thrust setting targets may or may not be divided by FN ref to obtain a ratio.

12. The system of embodiment 11, further comprising:
  a display (906) connected to the one or more computers (1002), the display displaying a commanded thrust target (Cmd), the take-off thrust setting targets (TO_PSP, MTO FN-T), the climb thrust setting targets (MCL FN-T, CLB_PSP), and the maximum continuous thrust setting targets (MCT FN-T, MCT_PSP); and
  a throttle 908 having a thrust resolver angle TRA capable of being changed to match the commanded thrust target (Cmd) to the take-off thrust setting targets, the climb thrust setting targets, or the maximum continuous thrust setting targets; wherein the commanded thrust target is used to control thrust generated from the engine 60*a*.

CONCLUSION

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:
1. A method of determining a thrust target for an engine powering an aircraft, comprising the steps of:
  (a) obtaining an idle thrust reference target as a function of a temperature, an airspeed (Mach number) of the aircraft, and an altitude of the aircraft;
  (b) locking the idle thrust reference target at a time when the airspeed exceeds a predetermined speed comprising a lockup speed, so as to obtain a locked idle thrust reference target;

(c) obtaining an maximum climb thrust reference target as a function of the temperature, the airspeed, and the altitude;

(d) locking a value of the maximum climb thrust reference target when the airspeed exceeds the lockup speed, so as to obtain a locked maximum climb thrust reference target;

(e) obtaining a maximum take-off thrust reference target as a function of the temperature, the altitude, and the airspeed and obtaining a locked value of the maximum take-off thrust reference target, comprising a locked maximum take-off thrust reference target, when the airspeed exceeds the lockup speed;

(f) locking values of the temperature and the altitude used in (e) when the airspeed exceeds the lockup speed, so as to obtain a locked temperature comprising a runway temperature and a locked altitude comprising an altitude of a runway from which the aircraft is taking off;

(g) after the airspeed exceeds the lockup speed, obtaining an adjustment ("altitude lapse") to the maximum take-off thrust reference target as a function of the runway temperature, the altitude of the runway, and the airspeed, and adjusting the maximum take-off thrust reference target with the adjustment to obtain an adjusted (lapsed) maximum take-off thrust reference target;

(h) dividing the adjusted (lapsed) maximum take-off thrust reference target obtained in (g) by the locked maximum take-off thrust reference target obtained in (e), or determining a difference between the adjusted (lapsed) maximum take-off thrust reference target and the locked maximum take-off thrust reference target, to obtain a thrust ratio or thrust difference respectively;

(i) multiplying the locked maximum climb thrust reference target obtained in (d) by the thrust ratio obtained in (h), or adding the locked maximum climb thrust reference target obtained in (d) to the thrust difference obtained in (h), to obtain an adjusted (lapsed) maximum climb thrust reference target;

(j) multiplying the locked idle thrust reference target obtained in (b) by the thrust ratio obtained in (h), or adding the locked idle thrust reference target obtained in (b) to the thrust difference obtained in (h), to obtain an adjusted (lapsed) idle thrust reference target;

(k) obtaining a commanded lapsed take-off thrust target based on a setting position of a thrust lever (thrust lever resolver angle, TRA) by interpolating between the adjusted (lapsed) maximum take-off thrust reference target, the adjusted (lapsed) maximum climb thrust reference target, and the adjusted (lapsed) idle thrust reference target, wherein the commanded lapsed take-off thrust target is a fraction of (or a fixed offset from) the maximum take-off thrust reference target; and (l) unlocking the values of temperature and the altitude after completion of take-off when the aircraft exceeds a pre-determined altitude and/or predetermined airspeed, so that a commanded thrust target is interpolated as a function of the TRA from the maximum take-off thrust reference target, the maximum climb thrust reference target, and the idle thrust reference target based on current real time values of the altitude, the temperature, and the airspeed (Mach number).

2. The method of claim 1, wherein:
the step (h) comprises dividing the adjusted (lapsed) maximum take-off thrust reference target obtained in (g) by the locked maximum take-off thrust reference target obtained in (e) to obtain the thrust ratio;

the step (i) comprises multiplying the locked maximum climb thrust reference target obtained in (d) by the thrust ratio obtained in (h) to obtain the adjusted (lapsed) maximum climb thrust reference target; and the step (j) comprises multiplying the locked idle thrust reference target obtained in (b) by the thrust ratio obtained in (h) to obtain the adjusted (lapsed) idle thrust reference target.

3. The method of claim 1, wherein the lockup speed is in a range of 50-100 knots.

4. The method of claim 1, wherein the steps (a)-(l) are performed in an electronic engine controller (EEC) on the aircraft.

5. The method of claim 1, wherein:
the airspeed is a current real time airspeed as indicated on an airspeed indicator and prior to the aircraft exceeding the pre-determined altitude and/or predetermined airspeed in step (1), the temperature comprises a current real time runway temperature, the altitude comprises a current real time runway altitude;

the idle thrust reference target is selected from a set of maximum idle thrust values for the engine, each of the maximum idle thrust values determined for the airspeed comprising one or more different airspeed values, the temperature, and the altitude;

the maximum climb thrust reference target is selected from a set of maximum climb thrust values for the engine, each of the maximum climb thrust values determined for the one or more different airspeed values, the temperature, and the altitude;

the maximum take-off thrust reference target is selected from a set of maximum take-off thrust values for the engine, each of the maximum take-off thrust values determined for the one or more different airspeed values, the temperature, and the altitude;

the locking of the idle thrust reference target comprises selecting and setting the locked idle thrust reference target comprising the one of the maximum idle thrust values determined for the temperature, the altitude, and the airspeed when the airspeed first exceeds the lockup speed;

the locking of the maximum climb thrust reference target comprises selecting and setting the locked maximum climb thrust reference target comprising the one of the maximum climb thrust values determined for the temperature, the altitude, and the airspeed when the airspeed first exceeds the lockup speed;

the locking of the temperature and the altitude comprises selecting and setting the locked temperature and the locked altitude as the current real time runway temperature and the current real time runway altitude, respectively, when the airspeed first exceeds the lockup speed in (e); and the commanded lapsed take-off thrust target is used to control an actual thrust of the engine.

6. The method of claim 1, further comprising:
during take-off, changing the TRA so that the commanded lapsed take-off thrust target determined in an electronic engine controller (EEC) matches a TMF-FMF take-off thrust setting target determined using a TMF-FMF computing platform; and during a climb phase, changing the TRA so that the commanded thrust target (determined in the EEC) matches a TMF-FMF climb thrust setting target or a TMF-FMF maximum continuous thrust setting target determined using the TMF-FMF computing platform.

7. The method of claim 6, further comprising:
determining thrust setting targets, using the TMF-FMF computing platform on the aircraft and a DPI-LSPS computing platform located off the aircraft, comprising:
  a plurality of take-off thrust setting targets in units of power during takeoff roll and a first segment of climb-out of the aircraft, including:
    the TMF-FMF take-off thrust setting target determined using the TMF-FMF computing platform, as a function of the temperature comprising the runway temperature, the altitude, and the airspeed,
    a DPI-LSPS take-off thrust setting target determined using the DPI-LSPS computing platform as a function of the temperature comprising the runway temperature, the altitude comprising a runway altitude, and the airspeed, and
    wherein the TMF-FMF take-off thrust setting target and the DPI-LSPS take-off thrust setting target comprise a maximum take-off thrust setting target or a derated take-off thrust setting target;
  a plurality of climb thrust setting targets in units of power during the climb-out, including:
    the TMF-FMF climb thrust setting target determined using the TMF-FMF computing platform as a function of the temperature, the airspeed, and the altitude of the aircraft,
    a DPI-LSPS climb thrust setting target, determined using the DPI-LSPS computing platform as a function of the temperature, the airspeed, and the altitude and
    wherein the TMF-FMF climb thrust setting target and the DPI-LSPS climb thrust setting target comprise a maximum climb thrust setting target or a derated climb setting target; and
  a plurality of maximum continuous thrust setting targets in units of power during airplane climb-out with Engine-Out condition, including:
    the TMF-FMF maximum continuous thrust setting target determined using the TMF-FMF computing platform as a function of the temperature, the airspeed, and the altitude, and
    a DPI-LSPS maximum continuous thrust setting target, determined using the DPI-LSPS computing platform as a function of the temperature, the airspeed, and the altitude.

8. The method of claim 7, wherein the take-off thrust setting targets, the climb thrust setting targets and the maximum continuous thrust setting targets are determined by:
  determining the maximum take-off thrust setting target as a function of the temperature, the altitude, and the airspeed;
  selecting the value of the temperature and the value of the altitude when the airspeed first exceeds the lockup speed, so as to obtain a selected temperature and a selected altitude;
  determining an adjustment to the maximum take-off thrust setting target as a function of the selected temperature, the selected altitude, and the altitude, and adjusting the maximum take-off thrust setting target with the adjustment to obtain an adjusted maximum take-off thrust setting target;
  multiplying the adjusted maximum take-off thrust setting target obtained with a takeoff derated percentage which is determined by a dispatch information, to obtain the derated take-off thrust setting target;
  determining the maximum climb thrust setting target as a function of the temperature, the altitude, and the airspeed;
  multiplying the maximum climb thrust setting target by a climb derated percentage which is determined by the dispatch information, to obtain a derated climb thrust setting target; and
  determining the maximum continuous thrust setting targets as a function of the temperature, the altitude, and the airspeed.

9. An Electronic Engine Controller (EEC), comprising:
a processor:
(a) obtaining an idle thrust reference target as a function of a temperature, an airspeed (Mach number) of an aircraft, and an altitude of the aircraft;
(b) locking the idle thrust reference target at a time when the airspeed exceeds a predetermined speed comprising a lockup speed, so as to obtain a locked idle thrust reference target;
(c) obtaining an maximum climb thrust reference target as a function of the temperature, the airspeed, and the altitude;
(d) locking a value of the maximum climb thrust reference target when the airspeed exceeds the lockup speed, so as to obtain a locked maximum climb thrust reference target;
(e) obtaining a maximum take-off thrust reference target as a function of the temperature, the altitude, and the airspeed and obtaining a locked value of the maximum take-off thrust reference target, comprising a locked maximum take-off thrust reference target, when the airspeed exceeds the lockup speed;
(f) locking the temperature and the altitude used in (e) when the airspeed exceeds the lockup speed, so as to obtain a locked temperature comprising a runway temperature and a locked altitude comprising an altitude of a runway from which the aircraft is taking off;
(g) after the airspeed exceeds the lockup speed, obtaining an adjustment ("altitude lapse") to the maximum take-off thrust reference target as a function of the runway temperature, the altitude of the runway, and the airspeed, and adjusting the maximum take-off thrust reference target with the adjustment to obtain an adjusted (lapsed) maximum take-off thrust reference target;
(h) dividing the adjusted (lapsed) maximum take-off thrust reference target obtained in (g) by the locked maximum take-off thrust reference target obtained in (e), or determining a difference between the adjusted (lapsed) maximum take-off thrust reference target and the locked maximum take-off thrust reference target, to obtain a thrust ratio or thrust difference respectively;
(i) multiplying the locked maximum climb thrust reference target obtained in (d) by the thrust ratio obtained in (h), or adding the locked maximum climb thrust reference target obtained in (d) to the thrust difference obtained in (h), to obtain an adjusted (lapsed) maximum climb thrust reference target;
(j) multiplying the locked idle thrust reference target obtained in (b) by the thrust ratio obtained in (h), or adding the locked idle thrust reference target obtained in (b) to the thrust difference obtained in (h), to obtain an adjusted (lapsed) idle thrust reference target;
(k) obtaining a commanded lapsed take-off thrust target based on a setting position of a thrust lever (thrust lever resolver angle, TRA) by interpolating between the adjusted (lapsed) maximum take-off thrust reference target, the adjusted (lapsed) maximum climb thrust reference target, and the adjusted (lapsed) idle thrust reference target, wherein the commanded lapsed take-off thrust target is a fraction of (or a fixed offset from) the maximum take-off thrust reference target; and (l) unlocking the values of temperature and the altitude after completion of take-off when the aircraft exceeds a pre-determined altitude and/or predetermined airspeed, so that a commanded thrust target is interpolated as a function of the TRA from the maximum take-off thrust reference target, the maximum climb thrust reference target, and the idle thrust reference target based on current real time values of the altitude, the temperature, and the airspeed (Mach number).

10. A system comprising the EEC of claim 9, further comprising:
   a computer obtaining:
      a plurality of take-off thrust setting targets in units of power during takeoff roll and a first segment of climb-out of the aircraft, including:
         a TMF-FMF take-off thrust setting target determined using a TMF-FMF computing platform, as a function of the temperature comprising the runway temperature, the altitude, and the airspeed,
         a DPI-LSPS take-off thrust setting target determined using a DPI-LSPS computing platform as a function of the temperature comprising the runway temperature, the altitude comprising a runway altitude, and the airspeed, and
         wherein the TMF-FMF take-off thrust setting target and the DPI-LSPS take-off thrust setting target comprise a maximum take-off thrust setting target or a derated take-off thrust setting target;
      a plurality of climb thrust setting targets in units of power during the climb-out, including:
         a TMF-FMF climb thrust setting target determined using the TMF-FMF computing platform as a function of the temperature, the airspeed, and the altitude of the aircraft,
         a DPI-LSPS climb thrust setting target, determined using the DPI-LSPS computing platform as a function of the temperature, the airspeed, and the altitude and
         wherein the TMF-FMF climb thrust setting target and the DPI-LSPS climb thrust setting target comprise a maximum climb thrust setting target or a derated climb thrust setting target; and
      a plurality of maximum continuous thrust setting targets in units of power during the climb-out with Engine-Out condition, including:
         a TMF-FMF maximum continuous thrust setting target determined using the TMF-FMF computing platform as a function of the temperature, the airspeed, and the altitude, and
         a DPI-LSPS maximum continuous thrust setting target, determined using the DPI-LSPS computing platform as a function of the temperature, the airspeed, and the altitude.

11. The system of claim 10, further comprising a display for an aircraft cockpit indicating the commanded lapsed take-off thrust target, the TMF-FMF take-off thrust setting target and the TMF-FMF climb thrust setting target.

12. The system of claim 10, further comprising the DPI-LSPS computing platform connected to the computer, wherein the DPI-LSPS computing platform determines the DPI-LSPS climb thrust setting target, the DPI-LSPS take-off thrust setting target, and the DPI-LSPS maximum continuous thrust setting target.

13. The system of claim 10, wherein the take-off thrust setting targets, the climb thrust setting targets and the maximum continuous thrust setting targets are determined by:
   determining the maximum take-off thrust setting target as a function of the temperature, the altitude, and the airspeed;
   selecting a value of the temperature and a value of the altitude when the airspeed first exceeds the lockup speed, so as to obtain a selected temperature and a selected altitude;
   determining an adjustment to the maximum take-off thrust setting target as a function of the selected temperature, the selected altitude, and the altitude, and adjusting the maximum take-off thrust setting target with the adjustment to obtain an adjusted maximum take-off thrust setting target;
   multiplying the adjusted maximum take-off thrust setting target obtained with a takeoff derated percentage which is determined by dispatch information, to obtain the derated take-off thrust setting target;
   determining the maximum climb thrust setting target as a function of the temperature, the altitude, and airspeed;
   multiplying the maximum climb thrust setting target by a climb derated percentage which is determined by the dispatch information, to obtain the derated climb thrust setting target; and
   determining the maximum continuous thrust setting targets as a function of the temperature, the altitude, and the airspeed.

14. The system of claim 10, further comprising:
   a throttle having a thrust lever resolver angle, wherein:
      during take-off, the TRA changes so that the commanded lapsed take-off thrust target determined in the electronic engine controller (EEC) matches the TMF-FMF take-off thrust setting target determined using the TMF-FMF computing platform; and
      during a climb phase, the TRA changes so that the commanded lapsed take-off thrust target (determined in the EEC) matches the TMF-FMF climb thrust setting target or the TMF-FMF maximum continuous thrust setting target determined using the TMF-FMF computing platform.

15. The system comprising the aircraft including the EEC of claim 9.

16. A system for controlling engine thrust of an engine, comprising:
   one or more computers:
      obtaining an idle thrust reference target in units of power, a maximum take-off thrust reference target in units of power, and a maximum climb thrust reference target (MCL FN) in units of power;
      determining an altitude lapse and/or a Mach lapse for take-off based on current dispatch flight and environmental conditions, so as to obtain an adjusted (lapsed) maximum take-off thrust reference target;
      adjusting the idle thrust reference target and the maximum climb thrust reference target using the altitude lapse and/or the Mach lapse, so as to obtain an adjusted idle thrust reference target and an adjusted maximum climb thrust reference target;
      calculating thrust setting targets including take-off thrust setting targets, climb thrust setting targets, and maximum continuous thrust setting targets; and
      interpolating the adjusted idle thrust reference target, the adjusted maximum climb thrust reference target, and the adjusted (lapsed) maximum take-off thrust reference target, to obtain a commanded lapsed take-off thrust target as a function of thrust resolver angle (TRA);

a display connected to the one or more computers, the display displaying the commanded lapsed take-off thrust target; and a throttle having a thrust resolver angle capable of being changed to match the commanded lapsed take-off thrust target to the take-off thrust setting targets, the climb thrust setting targets, or the maximum continuous thrust setting targets; wherein the commanded thrust target is used to control thrust generated from the engine.

17. An aircraft comprising the system of claim 16.

18. A system for determining engine thrust of an engine, comprising:

one or more computers determining:

take-off thrust setting targets in units of power during take-off roll and a first segment of climb-out of an aircraft, including:

a TMF-FMF take-off thrust setting target determined using a TMF-FMF computing platform, as a function of a temperature comprising a runway temperature, an altitude of the aircraft, and an airspeed of the aircraft, a DPI-LSPS take-off thrust setting target determined using a DPI-LSPS computing platform as a function of the temperature comprising the runway temperature, the altitude comprising a runway altitude, and the airspeed, and wherein the TMF-FMF take-off thrust setting target and the DPI-LSPS take-off thrust setting target each comprise a maximum take-off thrust setting target or a derated take-off thrust setting target;

a plurality of climb thrust setting targets in units of power during the climb-out, including:

a TMF-FMF climb thrust setting target determined using the TMF-FMF computing platform as a function of the temperature, the airspeed, and the altitude of the aircraft, a DPI-LSPS climb thrust setting target, determined using the DPI-LSPS computing platform as a function of the temperature, the airspeed, and the altitude and wherein the TMF-FMF climb thrust setting target and the DPI-LSPS climb thrust setting target each comprise a maximum climb thrust setting target or a derated climb setting target; and a plurality of maximum continuous thrust setting targets in units of power during the climb-out with Engine-Out condition, including:

a TMF-FMF maximum continuous thrust setting target determined using the TMF-FMF computing platform as a function of the temperature, the airspeed, and the altitude, and a DPI-LSPS maximum continuous thrust setting target, determined using the DPI-LSPS computing platform as a function of the temperature, the airspeed, and the altitude.

19. The system of claim 18, wherein the take-off thrust setting targets, the climb thrust setting targets and the maximum continuous thrust setting targets are determined by:

determining the maximum take-off thrust setting target as a function of the temperature, the altitude, and the airspeed;

selecting a value of the temperature and a value of the altitude when the airspeed first exceeds a lockup speed, so as to obtain a selected temperature and a selected altitude;

determining an adjustment to the maximum take-off thrust setting target as a function of the selected temperature, the selected altitude, and the altitude, and adjusting the maximum take-off thrust setting target with the adjustment to obtain an adjusted maximum take-off thrust setting target;

multiplying the adjusted maximum take-off thrust setting target obtained with a take-off derated percentage which is determined by dispatch information, to obtain the derated take-off thrust setting target;

determining the maximum climb thrust setting target as a function of the temperature, the altitude, and the airspeed;

multiplying the maximum climb thrust setting target by a climb derated percentage which is determined by the dispatch information, to obtain a derated climb thrust setting target; and determining the maximum continuous thrust setting targets as a function of the temperature, the altitude, and the airspeed.

20. The system of claim 19, further comprising:

a display connected to the one or more computers, the display displaying a commanded thrust target, the take-off thrust setting targets, the climb thrust setting targets, and the maximum continuous thrust setting targets; and a throttle having a thrust resolver angle capable of being changed to match the commanded thrust target to the take-off thrust setting targets, the climb thrust setting targets, or the maximum continuous thrust setting targets; wherein the commanded thrust target is used to control thrust generated from the engine.

* * * * *